US012727652B2

(12) United States Patent
Böing et al.

(10) Patent No.: US 12,727,652 B2
(45) Date of Patent: Sep. 8, 2026

(54) LIGHTWEIGHT HANDLE HEAD

(71) Applicant: Lekisport AG, Baar (CH)

(72) Inventors: Tobias Böing, Grossbettlingen (DE); Eberhard Heim, Unterensingen (DE); Marco Hofer, Unterböhringen (DE)

(73) Assignee: LEKISPORT AG, Baar (CH)

( * ) Notice: Subject to any disclaimer, the term of this patent is extended or adjusted under 35 U.S.C. 154(b) by 655 days.

(21) Appl. No.: 18/005,508

(22) PCT Filed: Jul. 2, 2021

(86) PCT No.: PCT/EP2021/068293

§ 371 (c)(1),
(2) Date: Jan. 13, 2023

(87) PCT Pub. No.: WO2022/012964

PCT Pub. Date: Jan. 20, 2022

(65) Prior Publication Data

US 2023/0309667 A1 Oct. 5, 2023

(30) Foreign Application Priority Data

Jul. 14, 2020 (EP) .................................... 20185606
Jul. 14, 2020 (EP) .................................... 20185607
(Continued)

(51) Int. Cl.
*A45B 9/02* (2006.01)
*A63C 11/22* (2006.01)
*B25G 1/10* (2006.01)

(52) U.S. Cl.
CPC .............. *A45B 9/02* (2013.01); *A63C 11/222* (2013.01); *A63C 11/2224* (2020.08);
(Continued)

(58) Field of Classification Search
CPC . A45B 9/02; A45B 2009/025; A45B 2200/05; A45B 2200/055; A63C 11/222;
(Continued)

(56) References Cited

U.S. PATENT DOCUMENTS 3,545,784 A * 12/1970 Allsop .............. A63C 11/2224 280/821
3,658,356 A * 4/1972 Van Reyper ....... A63C 11/2224 24/627
(Continued)

FOREIGN PATENT DOCUMENTS

CA 2923196 A1 * 9/2017 ............... A45B 9/02
CN 201691200 U 1/2011
(Continued)

OTHER PUBLICATIONS

International Search Report of PCT/EP2021/068293 dated Aug. 10, 2021 [PCT/ISA/210].

(Continued)

*Primary Examiner* — Robert Canfield
(74) *Attorney, Agent, or Firm* — Sughrue Mion, PLLC

(57) ABSTRACT

A pole handle for a ski pole or trekking pole, having a head region and a handle region, and an axial orifice which is open downwardly on one side to receive a pole tube, wherein the pole handle has a core with a left-hand side wall and a right-hand side wall, at least in certain regions, wherein the two side walls are connected at the top by a top surface so that the walls and the surface enclose a cavity, and the left-hand side wall and the right-hand side wall laterally delimit the cavity, and wherein the two side walls each have at least one aperture in a direction transverse to the pole handle longitudinal axis (S) and transverse to the direction of travel with a determined area.

25 Claims, 11 Drawing Sheets

(30) Foreign Application Priority Data

Dec. 8, 2020 (EP) .................................... 20212352
Dec. 8, 2020 (EP) .................................... 20212353

(52) U.S. Cl.
CPC ........ *A63C 11/2228* (2020.08); *A63C 11/227* (2013.01); *B25G 1/102* (2013.01); *A45B 2009/025* (2013.01); *A45B 2200/05* (2013.01); *A45B 2200/055* (2013.01)

(58) Field of Classification Search
CPC ............ A63C 11/2224; A63C 11/2228; A63C 11/227; B25G 1/102; B25G 1/10
USPC .................................................. 280/821, 822
See application file for complete search history.

(56) References Cited

U.S. PATENT DOCUMENTS

| | | | | | |
|---|---|---|---|---|---|
| 3,662,433 | A * | 5/1972 | Couttet | A63C 11/2224 | 280/822 |
| 4,130,293 | A * | 12/1978 | Hinterreiter | A63C 11/2224 | 280/822 |
| 6,439,610 | B1 * | 8/2002 | Pronzati | A63C 11/2224 | 24/191 |
| D1,015,467 | S * | 2/2024 | Müller | D21/775 | |
| D1,032,761 | S * | 6/2024 | Müller | D21/775 | |
| 2003/0042726 | A1 * | 3/2003 | Wang | A45B 9/02 | 280/821 |
| 2008/0012286 | A1 * | 1/2008 | Lenhart | A63C 11/2224 | 24/265 R |
| 2017/0231339 | A1 * | 8/2017 | Kreis | A63C 11/2228 | 135/76 |
| 2019/0216186 | A1 * | 7/2019 | Shintani | A63C 11/221 | |
| 2020/0352290 | A1 * | 11/2020 | Heim | A45B 9/02 | |
| 2021/0228972 | A1 * | 7/2021 | Heim | A63C 11/227 | |
| 2021/0307463 | A1 * | 10/2021 | Lai | A45B 9/02 | |
| 2022/0160086 | A1 * | 5/2022 | Chen | A45B 3/00 | |
| 2023/0255330 | A1 * | 8/2023 | Heim | A63C 11/2224 | 135/65 |
| 2024/0016266 | A1 * | 1/2024 | Lee | A47C 9/10 | |

FOREIGN PATENT DOCUMENTS

| | | | | |
|---|---|---|---|---|
| CN | 203105897 U | 8/2013 | | |
| DE | 29906612 U1 | 8/2000 | | |
| DE | 102006008066 A1 | 10/2006 | | |
| EP | 2168641 A1 * | 3/2010 | | A45B 9/02 |
| EP | 3415207 A1 | 12/2018 | | |
| WO | 2006/060932 A1 | 6/2006 | | |
| WO | 2006/084403 A1 | 8/2006 | | |
| WO | 2018/166854 A1 | 9/2018 | | |

OTHER PUBLICATIONS

Communication issued May 21, 2025 in Taiwanese Application No. 110125156.

* cited by examiner

LIGHTWEIGHT HANDLE HEAD

CROSS REFERENCE TO RELATED APPLICATIONS

This application is a National Stage of International Application No. PCT/EP2021/068293 filed on Jul. 2, 2021, claiming priority based on European Patent Application No. 20185606.9 filed on Jul. 14, 2020, European Patent Application No. 20185607.7 filed on Jul. 14, 2020, European Patent Application No. 20212353.5 filed on Dec. 8, 2020, and European Patent Application No. 20212352.7 filed on Dec. 8, 2020.

TECHNICAL FIELD

The present invention relates to a pole handle for, for example, a walking pole, a trekking pole, a ski pole or a Nordic walking pole. The present invention also relates to a pole having such a pole handle, and also to a method for assembling such a pole handle.

PRIOR ART

The prior art, for example DE 299 06 612 U1, discloses pole handles which are gripped by the user from a direction transverse to the pole longitudinal axis, wherein the contours of the pole handle are configured in such a way that they are suitable for a sequential arrangement of the fingers of the user's hand. In the case of an introduction of force from above, a protrusion serves to support the index finger towards the bottom. A walking pole in which a knob forms the pole handle is disclosed in DE 10 2006 008 066 A1. In this case, the knob is placed onto the pole shaft in an eccentric manner. This pole handle is only suitable for gripping from above.

Further pole handles with an ergonomic design of the handle head are known from EP-A-2 168 641.

In the case of such handle constructions, the straps may be fastened in an adjustable manner using various mechanisms, see for example EP-A-1 848 298, WO-A-2018/166854, EP-A-1 819 406.

US-A-2019216186 describes an ergonomic handle for a mobility device, comprising a central handle region, the lower portion of which widens towards the outside and forms a support ledge for an ulnar portion of the hand of a user when the hand grips the central column handle region and which extends substantially perpendicular to a longitudinal axis of the central column handle region so as to surround the lower portion of the handle region, wherein the handle has a slit cavity that splits the support ledge and extends upwards into the central column handle region, and the support ledge has an inclined ledge portion that is sloped downwards at a rear region of the support ledge.

SUMMARY OF THE INVENTION

It is correspondingly the object of the present invention to provide an improved and novel pole handle, in particular a pole handle which is as lightweight as possible using as little structure-forming material as possible but which nevertheless can provide the required stability even in the case of great loading. In addition, the intention is for the proposed pole handle to be able to be designed in a visually appealing manner, and for the technical functionality of the lightweight design to be able to be made visible towards the outside.

It is specifically a matter of proposing a pole handle, in particular for a ski pole, cross-country ski pole, trekking pole or Nordic walking pole, having a head region and a handle region, and also an axial orifice which is open downwardly on one side and which is intended to receive a pole tube.

According to the invention, in accordance with a first subject, such a pole handle is in particular characterized in that the pole handle has a core composed of the actual structure-forming material (for example and preferably composed of a thermoplastic material such as in particular polyamide, polycarbonate, polypropylene, polyethylene or mixtures thereof, optionally with (glass) fibre reinforcement), wherein the core has a first, left-hand side wall and a second, right-hand side wall in the interior of the handle, at least in certain regions. In other words, in the core, in the head region, there is a cavity which extends substantially along the direction of travel, which preferably runs approximately horizontally or which rises slightly towards the front in the direction of travel and which is delimited on the left-hand side by the first side wall and on the right-hand side by the right-hand side wall.

In this case, the two side walls are connected at the top by a top surface, wherein the side walls and the top surface enclose a cavity, and the first, left-hand side wall and the second, right-hand side wall in the head region laterally delimit the cavity. In this case, both side walls in each case have at least one or preferably two apertures in a direction transverse to the pole handle longitudinal axis and transverse to the direction of travel when used as intended. The apertures each form an aperture area, that is to say a cross-sectional area of the respective passage opening.

The individual aperture area of at least one of the apertures, preferably of the majority or of all of the apertures, is in this case more than 10 $mm^2$, in particular more than 15 $mm^2$, in particular in the range from 10-50 $mm^2$. Alternatively or additionally, the total area of the apertures on at least one or both sides, that is to say in a side wall, of the handle is more than 10 $mm^2$, preferably more than 15 $mm^2$, or more than 20 $mm^2$, in particular in the range from 10-50 $mm^2$.

Due to the design with the aforementioned cavity, the side walls and the apertures in these side walls, it is possible to structurally implement an elongate cavity extending in the direction of travel in the interior of the handle head in a stable manner, without thereby having to accept losses in the stability even in the case of great loading. The webs of this, for example organic, structure make it possible to ensure great stability, and the proposed design can also be readily implemented in the customary processes (injection-moulding processes) for the core of the pole handle.

A first preferred embodiment is characterized in that webs are formed between the apertures or the apertures are formed by a grid structure having apertures.

At least one or more of the apertures may be configured in the form of polygons, with optionally rounded corners, for example in the form of triangles, quadrilaterals (kite shapes, rhombus, square, rectangle, trapezoidal shape, for example parallelogram, trapezium).

Typically, the top surface is of closed or grid-like configuration. If the top surface is configured in a grid-like manner with complete apertures, the attachment described further below or a separate attachment or a coating preferably also covers the surface of the top surface in order to prevent the ingress of dirt or similar.

The pole handle preferably has at least one attachment which is preferably releasably fastened to the core, which encloses the core preferably in certain regions in the head region in a peripheral direction and which at least partially, preferably completely, covers the apertures and/or orifices in the top surface on the outer side, wherein the attachment is preferably fastened to the core in a force-fitting and/or form-fitting manner and/or is fastened in a form-fitting manner to a strap fastening element which is also inset in the handle head, or at least contributes to the guidance thereof. This may involve for example two attachments which are each laterally placed on, or alternatively one attachment which in the form of a clip engages around, and laterally bears against, the front tip.

The attachment is typically and preferably manufactured from a transparent or translucent thermoplastic material, for example polyamide, polycarbonate, polyacrylate (e.g. PMMA), POM or a mixture of such materials, so that it is possible to view the internal structure.

The pole handle having the head region and the handle region preferably has a hard core composed of a thermoplastic material and a soft material arranged thereon, for example composed of a foam or cork, in the handle region. In this case, the hard core composed of a thermoplastic material may have an encircling recess in the handle region, a corresponding sheathing composed of foam or cork being arranged in said recess. This brings about not only a further reduction in the weight but also a greater gripping comfort.

The sheathing may be composed of foam (for example EVA), cork, or alternatively of a composite, of wood, bast, textile, nonwoven, metal, or a combination of such materials.

In order that such constructions may also be assembled, the hard core may be separated, that is to say have an encircling slot, in the lower handle region, that is to say in that region in which the axial orifice for a pole tube is provided. It is thus possible for the two-part hard core of the handle to be assembled with the sheathing in that the upper region or the lower region of the hard core is initially provided, the encircling sheathing is pushed on, and the other region of the hard core is pushed into the free other opening of the sheathing and the parts are connected, for example adhesively bonded, to one another.

This proposed design may also be used to provide pole handles of various sizes and various shapes in a virtually modular manner. It is for example possible to configure the length of the handle region differently in that in each case provision is made of an identical head region and upper hard core, and lower hard core regions of differing length, and then a sheathing of the desired length together with a lower hard core region of the desired length is combined with always the same upper hard core.

Furthermore, additionally or independently thereof, it is possible to design the sheathing with a different shape in the case of an unchanging hard core. Thus, in the case of an unchanging hard core, it is possible to provide an entire series of different handles in that only different sheathings are used, wherein the various sheathings may vary with regard to material and/or shaping.

Particularly preferably, in the context of a handle series, all variation possibilities are utilized, for example in that there is a single hard core upper part comprising a handle head, said upper part always being identical, and lower hard cores of differing length depending on the desired length of the handle region, and sheathings of differing length composed of different material and having a different shaping. Alternatively, the upper parts comprising handle head and hard core region may also have different lengths and may be combined with lower, hard core regions, either having the same length and shaping or else having different length and shaping. In the end, even user-specific customized combinations may thus be provided with comparatively little outlay during the production, which opens up interesting possibilities particularly with the present possibilities with internet shipping directly from the production site to the customers.

The pole handle having a pole longitudinal axis and a front pole handle region pointing in a direction of travel and a rear pole handle region oriented in an opposite direction to the direction of travel, and also a gripping region and a curved head region adjoining the gripping region, wherein the gripping region has an upper gripping region adjacent to the head region and a lower gripping region averted from the head region, typically has a handle nose in the head region, said handle nose transitioning into the upper gripping region substantially without an offset in the front pole handle region, wherein, in the front pole handle region, the handle nose is formed with an overhang so as to protrude beyond the gripping region in the direction of travel.

In this case, the overhang typically amounts to more than about 50% of a mean extent of the gripping region in the direction of travel. Typically, in this case, a section plane of the head region, said section plane being defined by a transverse axis of the head region, said transverse axis being arranged transverse to the pole longitudinal axis and transverse to the direction of travel and being arranged at the point where the head region is widest as measured transverse to the direction of travel and transverse to the pole longitudinal axis, and a foremost tip of the handle nose, is angled away from the pole longitudinal axis at an obtuse angle of in the range from 90-135 degrees.

The handle head preferably protrudes beyond the handle region in a front region. For better grip, the handle head has at least one elevation on its front bottom side, preferably approximately halfway between the front edge of the handle region and the tip of the handle head. Further preferably, the bottom side, and optionally at least partially also a region which extends to a further extent laterally downwards, is manufactured from a material which is particularly comfortable to grip. Typically, the core of the handle head is composed of a hard thermoplastic material, such as for example polyamide, polycarbonate, polyethylene, polypropylene or mixtures or glass fibre-reinforced variants thereof. In the lower region of the handle head, a softer elastomer material, which then preferably also provides the above-mentioned elevation, may be provided as the material which is comfortable to grip. The entire core of the handle or at least the upper region comprising the handle head may correspondingly be produced from a single material, or in a 2 K-process with an elastomer insert in particular on the bottom side of the handle head.

It is also possible for the top side or top surface and a top portion of the strap fastening element to likewise be formed from an elastomer material that is comfortable to grip or be formed at least with a coating composed of an elastomer material that is comfortable to grip. In this case, the attachment may be configured in the form of a clip having two lateral arms, wherein the arms of this clip engage around the handle head virtually from the front, and wherein the arms extend from a front wall of the attachment rearward to the rear region of the head region of the pole handle and in this case cover the side walls partially and the apertures arranged therein preferably completely on the outer side.

In this case, preferably each of the lateral arms has at least a first means for force-fitting and/or form-fitting connection to the core and preferably additionally at least a second means for force-fitting and/or form-fitting connection to, or at least for guidance of, preferably also for captive securement of, a coupling element, wherein preferably at least the second means is a latching means which is arrested with latching action in a latching orifice or on a latching extension of a latching structure in the core, wherein further preferably a protrusion formed by the coupling element engages in a guide contour in the coupling element in a guiding manner, in particular for a tilting movement of the coupling element, but also retains the coupling element in the handle head.

Both the first, left-hand side wall and the second, right-hand side wall may each have, in the head region, at least three apertures in a direction transverse to the pole handle longitudinal axis and transverse to the direction of travel.

The first side wall and the second side wall preferably each have at least two or three apertures which are separated from one another by a respective web, wherein the webs extend from the top surface of the pole handle downward in the direction of the handle region and are preferably arranged substantially parallel to the pole handle longitudinal axis or in an angularly inclined manner with respect to the pole handle longitudinal axis.

The webs are preferably oriented in an inclined manner with respect to the pole handle longitudinal axis, wherein preferably webs which are arranged further towards the front in the direction of travel are inclined from the bottom to the top towards the front, particularly preferably at an angle with respect to the pole handle longitudinal axis of 20-80°, or in the range from 30-60°, and webs which are arranged further towards the rear in the direction of travel are inclined from the bottom to the top towards the rear, particularly preferably at an angle with respect to the pole handle longitudinal axis (S) of 10-70°, or in the range from 20-60°.

The apertures in the two side walls are preferably configured so as to be mirror-symmetrical with respect to a plane defined by the pole handle longitudinal axis and the direction of travel.

In relation to a lower region of the head region, the side walls are furthermore preferably offset inward towards the cavity in an upper region of the head region, as a result of which a shoulder which partially encircles the head region in the peripheral direction and on which the attachment at least partially rests is formed between the upper region of the head region and the lower region of the head region, wherein preferably a substantially continuous surface of the handle region, said surface being closed apart from gaps between components, is formed by the shaping of the attachment and the position thereof in this offset region.

The webs typically extend from the top surface of the pole handle downward in the direction of the handle region up to the partially encircling shoulder.

A further preferred embodiment is characterized in that the attachment is configured to be at least partially, preferably completely, transparent or translucent, such that the apertures of the core are visible from the outside.

In the head region which is delimited towards the top by a top surface, the pole handle may have a central orifice on the rear side, a strap fastening element with a hand strap fastened to the strap fastening element being received in said central orifice in a rear region of the head region, wherein preferably the strap fastening element has an aperture which is aligned with an aperture of the side walls such that, in a rest position, the strap fastening element is substantially not visible from the outside as viewed through the aperture of the side walls.

The pole handle according to the invention further preferably has two lateral arcuate or angled webs between the top surface and a lower region of the handle head, on the rear side of the handle head, between which webs a strap fastening element as described above is preferably arranged.

Furthermore, the pole handle may have an attachment which is releasably fastened to the core, which encloses the core in certain regions in the head region in the peripheral direction and which at least partially, preferably completely, covers the apertures and/or orifices in the top surface, including the aperture formed by the webs, on the outer side, wherein the attachment is preferably fastened to the core in a force-fitting and/or form-fitting manner and/or is fastened in a form-fitting manner to a strap fastening element which is also inset in the handle head in that regions of the attachment engage behind the webs on the inner side, and possibly engage in a guiding manner in curved orifices of a strap fastening element. The use of additional fastening elements may be dispensed with as a result.

The present invention also relates to a method for assembling a pole handle as presented above, which method is in particular characterized in that the hand strap is fastened to the strap fastening element by way of a free end, and is subsequently introduced in the form of a module into the central orifice and fastened in the handle head in a tiltable manner by means of a transverse pin. Preferably, prior to the insertion of the strap fastening element or subsequently thereto, an attachment is pushed on and fastened to the handle head preferably from the front or laterally and preferably in a self-latching manner. As a result, the attachment is additionally secured to the handle head by means of the strap fastening element, or the strap fastening element is additionally secured to the handle head by means of this attachment or regions thereof, and is preferably additionally guided for the tilting movement.

Finally, the present invention relates to a pole, in particular a ski pole, cross-country ski pole or Nordic walking pole, having a pole handle as presented above or assembled as presented above.

Alternatively or additionally, the present case concerns a pole handle having the following properties:

The pole handle has a central orifice in which a strap fastening element with a hand strap which is fastened to the strap fastening element and which is adjustable in terms of its size is at least partially received.

In this case, the pole handle is characterized in that the strap fastening element and the hand strap fastened to the strap fastening element form a modular unit which is configured separately from a core of the pole handle and which is fastened to the core of the pole handle so as to be reversibly tiltable about an axis of rotation in the pole handle.

In this case, the strap fastening element, in a rest position X1 in which the strap fastening element is embedded in the surface contour of the handle head and in which the size of the hand strap cannot be adjusted, can be tilted about the axis of rotation upwards into an adjustment position X2, and the size of the hand strap can be adjusted in this adjustment position X2.

In this way, a simple design that is advantageous in particular with regard to assembly, repair and replacement of components is provided, said design ensuring excellent fixing of the strap in the rest position, and nevertheless permitting simple length adjustment of the hand strap in the adjustment position. The strap fastening element may be prefabricated in the form of a module and may be installed together with the hand strap, as a whole, in a corresponding handle head. It is thus also possible for the production processes and the warehousing to be optimized, since such a unit may be used for various models in respect of further design of the handle.

A first preferred embodiment is characterized in that the strap fastening element has a passage opening through which the strap band of the hand strap is guided out of the pole handle, said strap band is guided around the hand of the user and passes by way of the free end through the same passage opening back through the strap fastening element, wherein preferably the free end of the strap band is guided behind this passage opening downward around the strap fastening element around a deflection region and is subsequently guided in the form of a free strap end, below the strap, out of the handle head. This guidance of the strap simultaneously permits a good clamping action and, on the other hand, also advantages with regard to modularity, since the prefabricated unit composed of strap fastening element and hand strap may be assembled in a simple manner, particularly if the one end of the strap is fastened to the strap fastening element.

In the rest position, the strap band is preferably clamped in a fixed manner between a bottom side of the strap fastening element and a base of the central orifice that lies opposite. In this case, means for preventing the adjustment of the size of the hand strap are preferably arranged in the clamping region and/or in the deflection region.

These means may preferably be configured at least partially in the form of one or more clamping protrusions or clamping offset portions and/or corresponding recesses, steps or grooves in the mating surface.

Particularly preferably, in this case at least one rib running transverse to the direction of travel is arranged on the bottom side of the strap fastening element, and a corresponding step is arranged in the base of the central orifice that lies opposite.

A further preferred embodiment is distinguished in that the strap fastening element is fastened to the core of the pole handle in a tiltable manner by means of a transverse pin which is arranged along the axis of rotation transverse to a direction of travel and transverse to the pole handle longitudinal axis in a passage opening of the core of the pole handle. The strap fastening element may also be fastened, that is to say in particular captively secured, to the core of the pole handle by means of a direct or indirect connection which preferably simultaneously provides a guide function for the tilting movement between rest position X1 and adjustment position X2. To this end, protrusions which at least partially engage in curved orifices in the side surfaces are particularly preferably provided on the core and/or on a separate element.

Furthermore, latching elements may preferably be provided, which can at least partially arrest the strap fastening element with latching action in the rest position X1 and/or in the adjustment position X2. Preferably, such a mechanism is provided in both positions.

In this case, the strap fastening element may have at least a first latching channel, in which at least a first latching ridge engages in the rest state X1, in at least one side surface, wherein the strap fastening element then preferably has two latching channels or grooves which are arranged on two mutually opposite side walls of the strap fastening element that are arranged parallel to one another. Preferably, the core has two latching ridges which are directed inwards into the central orifice and which are arranged on two mutually opposite side walls of the core that are arranged substantially parallel to one another, said latching ridges engaging in the two latching channels.

Alternatively or additionally, it is possible for the strap fastening element to have at least a second latching channel, in which at least a first latching ridge engages in the adjustment position X2, in at least one side surface, wherein the strap fastening element preferably has two latching channels or grooves which are arranged on two mutually opposite side walls of the strap fastening element that are arranged parallel to one another, and wherein preferably the core has two latching ridges which are directed inwards into the central orifice and which are arranged on two mutually opposite side walls of the core that are arranged substantially parallel to one another, said latching ridges engaging in the two latching channels.

A further preferred embodiment is characterized in that the hand strap has a strap portion which encircles the hand of the user, and also has a deflection portion which adjoins the strap portion on one side, which is introduced into a slot-like passage opening of the strap fastening element and which is guided downwards in the central orifice around a deflection region of the strap fastening element, and a first free end which protrudes from the central orifice and which adjoins the deflection portion, wherein the hand strap also has a second end which is adjacent to the encircling strap portion and which is fastened to the strap fastening element, preferably to a front wall, arranged in the central orifice of the pole handle, of the strap fastening element, particularly preferably by way of a fastening means which is preferably a screw, a rivet, a pin, a hook, an adhesive bond or a combination thereof.

The strap fastening element may preferably have at least one orifice which is preferably arranged transverse to the direction of travel.

Furthermore, the strap fastening element may have, on its front surface, in the transition to the top portion (which, in use, forms the surface of the handle head in the rest position X1), means, in particular in the form of a protrusion and/or a sealing lip, which ensure a seal.

The pole handle may also have at least one, preferably clip-like, attachment which is connected to the strap fastening element and/or to the core in a form-fitting and releasable manner. This may involve for example two attachments which are each laterally placed on. In the case of a clip-like attachment, the latter may have two side walls which converge in a front wall in the direction of travel and which are connected towards the bottom in a front region by a base, wherein the side walls each have a free end which is directed rearward counter to the direction of travel and on which a respective latching peg is arranged, and wherein the latching pegs engage in a respective curved guide channel arranged on opposite side walls of the strap fastening element, as a result of which the strap fastening element is guided in the central orifice of the pole handle during a tilting movement of the strap fastening element, and wherein preferably the at least one guide channel is formed along the curvature of a top portion of the strap fastening element.

Typically, the attachment is connected to the core (1*a*) of the pole handle in a form-fitting and releasable manner, preferably by means of at least one latching connection.

The angle between the rest position X1 and the adjustment position X2 advantageously lies in the range from 20-90°, preferably in the range from 30-80°, particularly preferably in the range from 45-70°.

The pole handle preferably has a first form-fitting connection between the core and the strap fastening element, and also a second form-fitting connection between the strap fastening element and the attachment and a third form-fitting connection between the core and the attachment.

The strap fastening element may have a curved top portion which, in the fixed position, is integrated at least partially or in particular virtually completely in an outer contour of the head region.

Further embodiments are specified in the dependent claims.

In accordance with a further second subject which is independent of the foregoing or in addition to the foregoing, the application relates to the following:

It is specifically a matter of providing a pole handle, in particular for a ski pole, cross-country ski pole, trekking pole or Nordic walking pole, having a head region and a handle region, and also an axial orifice for receiving a pole tube, and a hand strap which is fastened thereto and which is adjustable in terms of its size.

In this case, the pole handle has a central orifice in which a strap fastening element with a hand strap which is fastened to the strap fastening element and which is adjustable in terms of its size is at least partially received.

In this case, according to the invention, the pole handle is characterized in that the strap fastening element and the hand strap fastened to the strap fastening element form a modular unit which is configured separately from a core of the pole handle and which is fastened to the core of the pole handle so as to be reversibly tiltable about an axis of rotation in the pole handle.

In this case, the strap fastening element, in a rest position X1 in which the strap fastening element is embedded in the surface contour of the handle head and in which the size of the hand strap cannot be adjusted, specifically preferably in that the band of the hand strap is fixed in a force-fitting and not form-fitting manner, can be tilted about the axis of rotation upwards into an adjustment position X2, and the size of the hand strap can be adjusted in this adjustment position X2.

In this way, a simple design that is advantageous in particular with regard to assembly, repair and replacement of components is provided, said design ensuring excellent fixing of the strap in the rest position, and nevertheless permitting simple length adjustment of the hand strap in the adjustment position. The strap fastening element may be prefabricated in the form of a module and may be installed together with the hand strap, as a whole, in a corresponding handle head. It is thus also possible for the production processes and the warehousing to be optimized, since such a unit may be used for various models in respect of further design of the handle.

A first preferred embodiment is characterized in that the strap fastening element has a passage opening through which the strap band of the hand strap is guided out of the pole handle, said strap band is guided around the hand of the user and passes by way of the free end through the same passage opening back through the strap fastening element, wherein preferably the free end of the strap band is guided behind this passage opening downward around the strap fastening element around a deflection region and is subsequently guided in the form of a free strap end, below the strap, out of the handle head. Preferably, in the rest position, the strap band is fixed in its position between the strap fastening element and the core of the pole handle by way of a pure clamping action, that is to say by way of a force fit. In this case, in particular holes in the strap band for a form-fitting fastening are dispensed with, in order to enable as many different positions as possible.

This guidance of the strap simultaneously permits a good clamping action and, on the other hand, also advantages with regard to modularity, since the prefabricated unit composed of strap fastening element and hand strap may be assembled in a simple manner, particularly if the one end of the strap is fastened to the strap fastening element.

In the rest position, the strap band is preferably clamped in a fixed manner between a bottom side of the strap fastening element and a base of the central orifice that lies opposite. In this case, means for preventing the adjustment of the size of the hand strap are preferably arranged in the clamping region and/or in the deflection region.

These means may preferably be configured at least partially in the form of one or more clamping protrusions or clamping offset portions and/or corresponding recesses, steps or grooves in the mating surface.

Particularly preferably, in this case at least one rib running transverse to the direction of travel is arranged on the bottom side of the strap fastening element, and a corresponding step is arranged in the base of the central orifice that lies opposite.

A further preferred embodiment is distinguished in that the strap fastening element is fastened to the core of the pole handle in a tiltable manner by means of a transverse pin which is arranged along the axis of rotation transverse to a direction of travel and transverse to the pole handle longitudinal axis in a passage opening of the core of the pole handle.

The strap fastening element may also be fastened, that is to say in particular captively secured, to the core of the pole handle by means of a direct or indirect connection which preferably simultaneously provides a guide function for the tilting movement between rest position X1 and adjustment position X2. To this end, protrusions which at least partially engage in curved orifices in the side surfaces are particularly preferably provided on the core and/or on a separate element.

Furthermore, latching elements may preferably be provided, which can at least partially arrest the strap fastening element with latching action in the rest position X1 and/or in the adjustment position X2. Preferably, such a mechanism is provided in both positions.

In this case, the strap fastening element may have at least a first latching channel, in which at least a first latching ridge engages in the rest state X1, in at least one side surface, wherein the strap fastening element then preferably has two latching channels or grooves which are arranged on two mutually opposite side walls of the strap fastening element that are arranged parallel to one another. Preferably, the core has two latching ridges which are directed inwards into the central orifice and which are arranged on two mutually opposite side walls of the core that are arranged substantially parallel to one another, said latching ridges engaging in the two latching channels.

Alternatively or additionally, it is possible for the strap fastening element to have at least a second latching channel, in which at least a first latching ridge engages in the adjustment position X2, in at least one side surface, wherein the strap fastening element preferably has two latching channels or grooves which are arranged on two mutually opposite side walls of the strap fastening element that are arranged parallel to one another, and wherein preferably the core has two latching ridges which are directed inwards into the central orifice and which are arranged on two mutually opposite side walls of the core that are arranged substantially parallel to one another, said latching ridges engaging in the two latching channels.

A further preferred embodiment is characterized in that the hand strap has a strap portion which encircles the hand of the user, and also has a deflection portion which adjoins the strap portion on one side, which is introduced into a slot-like passage opening of the strap fastening element and which is guided downwards in the central orifice around a deflection region of the strap fastening element, and a first free end which protrudes from the central orifice and which adjoins the deflection portion, wherein the hand strap also has a second end which is adjacent to the encircling strap portion and which is fastened to the strap fastening element, preferably to a front wall, arranged in the central orifice of the pole handle, of the strap fastening element, particularly preferably by way of a fastening means which is preferably a screw, a rivet, a pin, a hook, an adhesive bond or a combination thereof.

The strap fastening element may preferably have at least one orifice which is preferably arranged transverse to the direction of travel.

Furthermore, the strap fastening element may have, on its front surface, in the transition to the top portion (which, in use, forms the surface of the handle head in the rest position X1), means, in particular in the form of a protrusion and/or a sealing lip, which ensure a seal.

The pole handle may also have at least one, preferably clip-like, attachment which is connected to the strap fastening element and/or to the core in a form-fitting and releasable manner. This may involve for example two attachments which are each laterally placed on. In the case of a clip-like attachment, the latter may have two side walls which converge in a front wall in the direction of travel and which are connected towards the bottom in a front region by a base, wherein the side walls each have a free end which is directed rearward counter to the direction of travel and on which a respective latching peg is arranged, and wherein the latching pegs engage in a respective curved guide channel arranged on opposite side walls of the strap fastening element, as a result of which the strap fastening element is guided in the central orifice of the pole handle during a tilting movement of the strap fastening element, and wherein preferably the at least one guide channel is formed along the curvature of a top portion of the strap fastening element.

Typically, the attachment is connected to the core (1*a*) of the pole handle in a form-fitting and releasable manner, preferably by means of at least one latching connection.

The angle between the rest position X1 and the adjustment position X2 advantageously lies in the range from 20-90°, preferably in the range from 30-80°, particularly preferably in the range from 45-70°.

The pole handle preferably has a first form-fitting connection between the core and the strap fastening element, and also a second form-fitting connection between the strap fastening element and the attachment and a third form-fitting connection between the core and the attachment.

The strap fastening element may have a curved top portion which, in the fixed position, is integrated at least partially or in particular virtually completely in an outer contour of the head region.

The handle head preferably protrudes beyond the handle region in a front region. For better grip, the handle head has at least one elevation on its front bottom side, preferably approximately halfway between the front edge of the handle region and the tip of the handle head. Further preferably, the bottom side, and optionally at least partially also a region which extends to a further extent laterally downwards, is manufactured from a material which is particularly comfortable to grip. Typically, the core of the handle head is composed of a hard thermoplastic material, such as for example polyamide, polycarbonate, polyethylene, polypropylene or mixtures or glass fibre-reinforced variants thereof. In the lower region of the handle head, a softer elastomer material, which then preferably also provides the above-mentioned elevation, may be provided as the material which is comfortable to grip. The entire core of the handle or at least the upper region comprising the handle head may correspondingly be produced from a single material, or in a 2 K-process with an elastomer insert in particular on the bottom side of the handle head.

It is also possible for the top side or top surface and a top portion of the strap fastening element to likewise be formed from an elastomer material that is comfortable to grip or be formed at least with a coating composed of an elastomer material that is comfortable to grip. The present invention also relates to a method for assembling a pole handle as presented above, which method is characterized in that the hand strap is fastened to the strap fastening element by way of a free end, and is subsequently introduced in the form of a module into the central orifice and fastened in the handle head in a tiltable manner by means of a transverse pin. Preferably, prior to the insertion of the strap fastening element or subsequently thereto, at least one attachment is preferably pushed on laterally or from the front and fastened to the handle head preferably in a self-latching manner. As a result, the attachment is additionally secured to the handle head by means of the strap fastening element, or the strap fastening element is additionally secured to the handle head by means of this attachment or regions thereof. The strap fastening element is preferably additionally guided by an engagement of the attachment for the tilting movement.

Finally, the present invention relates to a pole, in particular a ski pole, cross-country ski pole or Nordic walking pole, having a pole handle as presented above or assembled as presented above.

Alternatively or additionally, the present case concerns a pole handle having the following properties:

A pole handle, in particular for a ski pole, cross-country ski pole, trekking pole or Nordic walking pole, having a head region and a handle region, and also an axial orifice which is open downwardly on one side and which is intended to receive a pole tube.

In this case, such a pole handle is in particular characterized in that the pole handle has a core composed of the actual structure-forming material (for example and preferably composed of a thermoplastic material such as in particular polyamide, polycarbonate, polypropylene, polyethylene or mixtures thereof, optionally with (glass) fibre reinforcement), wherein the core has a first, left-hand side wall and a second, right-hand side wall in the interior of the handle, at least in certain regions.

In this case, the two side walls are connected at the top by a top surface, wherein the side walls and the top surface enclose a cavity, and the first, left-hand side wall and the second, right-hand side wall in the head region laterally delimit the cavity. In this case, both side walls in each case have at least one or preferably two apertures in a direction transverse to the pole handle longitudinal axis and transverse to the direction of travel when used as intended.

The individual aperture area of at least one of the apertures, preferably of the majority or of all of the apertures, is in this case more than 10 $mm^2$, in particular more than 15 $mm^2$, in particular in the range from 10-50 $mm^2$. Alternatively or additionally, the total area of the apertures on at least one or both sides, that is to say in a side wall, of the handle is more than 10 $mm^2$, preferably more than 15 $mm^2$, or more than 20 $mm^2$, in particular in the range from 10-50 $mm^2$.

Due to the design with the side walls and the apertures in these side walls, it is possible to structurally implement an elongate cavity in the interior of the handle head in a stable manner, without thereby having to accept losses in the stability even in the case of great loading. The webs of this, for example organic structure make it possible to ensure great stability, and the proposed design can also be readily implemented in the customary processes (injection-moulding processes) for the core of the pole handle.

A first preferred embodiment is characterized in that webs are formed between the apertures or the apertures are formed by a grid structure having apertures.

At least one or more of the apertures may be configured in the form of polygons, with optionally rounded corners, for example in the form of triangles, quadrilaterals (kite shapes, rhombus, square, rectangle, trapezoidal shape, for example parallelogram, trapezium).

Typically, the top surface is of closed or grid-like configuration. If the top surface is configured in a grid-like manner with complete apertures, the attachment described further below or a separate attachment or a coating preferably also covers the surface of the top surface in order to prevent the ingress of dirt or similar.

The pole handle preferably has at least one attachment which is preferably releasably fastened to the core, which encloses the core preferably in certain regions in the head region in a peripheral direction and which at least partially, preferably completely, covers the apertures and/or orifices in the top surface on the outer side, wherein the attachment is preferably fastened to the core in a force-fitting and/or form-fitting manner and/or is fastened in a form-fitting manner to a strap fastening element which is also inset in the handle head. This may involve for example two attachments which are each laterally placed on.

The attachment is typically and preferably manufactured from a transparent or translucent thermoplastic material, for example polyamide, polycarbonate, polyacrylate (e.g. PMMA), POM or a mixture of such materials, so that it is possible to view the internal structure.

The pole handle having the head region and the handle region preferably has a hard core composed of a thermoplastic material and a soft material arranged thereon, for example composed of a foam or cork, in the handle region. In this case, the hard core composed of a thermoplastic material may have an encircling recess in the handle region, a corresponding sheathing composed of foam or cork being arranged in said recess. This brings about not only a further reduction in the weight but also a greater gripping comfort. The sheathing may be composed of foam (for example EVA), cork, or alternatively of a composite, of wood, bast, textile, nonwoven, metal, or a combination of such materials.

In order that such constructions may also be assembled, the hard core may be separated, that is to say have an encircling slot, in the lower handle region, that is to say in that region in which the axial orifice for a pole tube is provided. It is thus possible for the two-part hard core of the handle to be assembled with the sheathing in that the upper region or the lower region of the hard core is initially provided, the encircling sheathing is pushed on, and the other region of the hard core is pushed into the free other opening of the sheathing and the parts are connected, for example adhesively bonded, to one another.

This proposed design may also be used to provide pole handles of various sizes and various shapes in a virtually modular manner. It is for example possible to configure the length of the handle region differently in that in each case provision is made of an identical head region and upper hard core, and lower hard core regions of differing length, and then a sheathing of the desired length together with a lower hard core region of the desired length is combined with always the same upper hard core.

Furthermore, additionally or independently thereof, it is possible to design the sheathing with a different shape in the case of an unchanging hard core. Thus, in the case of an unchanging hard core, it is possible to provide an entire series of different handles in that only different sheathings are used, wherein the various sheathings may vary with regard to material and/or shaping.

Particularly preferably, in the context of a handle series, all variation possibilities are utilized, for example in that there is a single hard core upper part comprising a handle head, said upper part always being identical, and lower hard cores of differing length depending on the desired length of the handle region, and sheathings of differing length composed of different material and having a different shaping. Alternatively, the upper parts comprising handle head and hard core region may also have different lengths and may be combined with lower, hard core regions, either having the same length and shaping or else having different length and shaping. In the end, even user-specific customized combinations may thus be provided with comparatively little outlay during the production, which opens up interesting possibilities particularly with the present possibilities with internet shipping directly from the production site to the customers.

The pole handle having a pole longitudinal axis and a front pole handle region pointing in a direction of travel and a rear pole handle region oriented in an opposite direction to the direction of travel, and also a gripping region and a curved head region adjoining the gripping region, wherein the gripping region has an upper gripping region adjacent to the head region and a lower gripping region averted from the head region, typically has a handle nose in the head region, said handle nose transitioning into the upper gripping region substantially without an offset in the front pole handle region, wherein, in the front pole handle region, the handle nose is formed with an overhang so as to protrude beyond the gripping region in the direction of travel.

In this case, the overhang typically amounts to more than about 50% of a mean extent of the gripping region in the direction of travel. Typically, in this case, a section plane of the head region, said section plane being defined by a transverse axis of the head region, said transverse axis being arranged transverse to the pole longitudinal axis and transverse to the direction of travel and being arranged at the point where the head region is widest as measured transverse to the direction of travel and transverse to the pole longitudinal axis, and a foremost tip of the handle nose, is angled away from the pole longitudinal axis at an obtuse angle of in the range from 90-135 degrees.

In this case, the attachment may be configured in the form of a clip having two lateral arms, wherein the arms of this clip engage around the handle head virtually from the front, and wherein the arms extend from a front wall of the attachment rearward to the rear region of the head region of the pole handle and in this case cover the side walls partially and the apertures arranged therein preferably completely on the outer side.

In this case, preferably each of the lateral arms has at least a first means for force-fitting and/or form-fitting connection to the core and preferably additionally at least a second means for force-fitting and/or form-fitting connection to a coupling element, wherein preferably at least the second means is a latching means which is arrested with latching action in a latching orifice or on a latching extension of a latching structure in the core.

Both the first, left-hand side wall and the second, right-hand side wall may each have, in the head region, at least three apertures in a direction transverse to the pole handle longitudinal axis and transverse to the direction of travel.

The first side wall and the second side wall preferably each have at least two or three apertures which are separated from one another by a respective web, wherein the webs extend from the top surface of the pole handle downward in the direction of the handle region and are preferably arranged substantially parallel to the pole handle longitudinal axis or in an angularly inclined manner with respect to the pole handle longitudinal axis.

The webs are preferably oriented in an inclined manner with respect to the pole handle longitudinal axis, wherein preferably webs which are arranged further towards the front in the direction of travel are inclined from the bottom to the top towards the front, particularly preferably at an angle with respect to the pole handle longitudinal axis of 20-80°, or in the range from 30-60°, and webs which are arranged further towards the rear in the direction of travel are inclined from the bottom to the top towards the rear, particularly preferably at an angle with respect to the pole handle longitudinal axis of 10-70°, or in the range from 20-60°.

The apertures in the two side walls are preferably configured so as to be mirror-symmetrical with respect to a plane defined by the pole handle longitudinal axis and the direction of travel.

In relation to a lower region of the head region, the side walls are furthermore preferably offset inward towards the cavity in an upper region of the head region, as a result of which a shoulder which partially encircles the head region in the peripheral direction and on which the attachment at least partially rests is formed between the upper region of the head region and the lower region of the head region, wherein preferably a substantially continuous surface of the handle region, said surface being closed apart from gaps between components, is formed by the shaping of the attachment and the position thereof in this offset region.

The webs typically extend from the top surface of the pole handle downward in the direction of the handle region up to the partially encircling shoulder.

A further preferred embodiment is characterized in that the attachment is configured to be at least partially, preferably completely, transparent or translucent, such that the apertures of the core are visible from the outside.

In the head region which is delimited towards the top by a top surface, the pole handle may have a central orifice on the rear side, a strap fastening element with a hand strap fastened to the strap fastening element being received in said central orifice in a rear region of the head region, wherein preferably the strap fastening element has an aperture which is aligned with an aperture of the side walls such that, in a rest position, the strap fastening element is substantially not visible from the outside as viewed through the aperture of the side walls.

The pole handle according to the invention further preferably has two lateral arcuate or angled webs between the top surface and a lower region of the handle head, on the rear side of the handle head, between which webs a strap fastening element as described above is preferably arranged.

Furthermore, the pole handle may have an attachment which is releasably fastened to the core, which encloses the core in certain regions in the head region in the peripheral direction and which at least partially, preferably completely, covers the apertures and/or orifices in the top surface, including the aperture formed by the webs, on the outer side, wherein the attachment is preferably fastened to the core in a force-fitting and/or form-fitting manner and/or is fastened in a form-fitting manner to a strap fastening element which is also inset in the handle head in that regions of the attachment engage behind the webs on the inner side, and possibly engage in a guiding manner in curved orifices of a strap fastening element. The use of additional fastening elements may be dispensed with as a result.

The second subject is characterized by the following aspects, which may be employed in isolation or combined with the first subject:

Aspect 1: Pole handle, in particular for a ski pole, cross-country ski pole, trekking pole or Nordic walking pole, having a head region and a handle region, and also an axial orifice for receiving a pole tube, and a hand strap which is fastened thereto and which is adjustable in terms of its size, wherein the pole handle has a central orifice in which a strap fastening element with a hand strap which is fastened to the strap fastening element and which is adjustable in terms of its size is at least partially received, characterized in that the strap fastening element and the hand strap fastened to the strap fastening element form a modular unit which is configured separately from a core (1*a*) of the pole handle and which is fastened to the core of the pole handle so as to be reversibly tiltable about an axis of rotation (D) in the pole handle, wherein the strap fastening element can be tilted from a rest position (X1), in which the strap fastening element is embedded in the surface contour of the handle head and in which the size of the hand strap cannot be adjusted, about the axis of rotation (D) upwards into an adjustment position (X2), and the size of the hand strap can be adjusted in this adjustment position (X2).

Aspect 2: Pole handle according to aspect 1, characterized in that the strap fastening element has a passage opening through which the strap band of the hand strap is guided out of the pole handle, said strap band is guided around the hand of the user and passes by way of the free end through the same passage opening back through the strap fastening element, wherein preferably the free end of the strap band is guided behind this passage opening downward around the strap fastening element around a deflection region and is subsequently guided in the form of a free strap end, below the strap, out of the handle head.

Aspect 3: Pole handle according to aspect 2, characterized in that, in the rest position (X1), the strap band is clamped in a fixed manner between a bottom side of the strap fastening element and a base of the central orifice that lies opposite, wherein preferably means for preventing the adjustment of the size of the hand strap are arranged in the clamping region and/or in the deflection region, and wherein particularly preferably these means are configured at least partially in the form of one or more clamping protrusions or clamping offset portions and/or corresponding recesses, steps or grooves in the mating surface, and wherein particularly preferably at least one rib running transverse to the direction of travel is arranged on the bottom side of the strap fastening element, and a corresponding step is arranged in the base of the central orifice that lies opposite.

Aspect 4: Pole handle according to one of the preceding aspects, characterized in that the strap fastening element is fastened to the core of the pole handle in a tiltable manner by means of a transverse pin which is arranged along the axis of rotation (D) transverse to a direction of travel (L) and transverse to the pole handle longitudinal axis (S) in a passage opening of the core of the pole handle.

Aspect 5: Pole handle according to one of the preceding aspects, characterized in that the strap fastening element is also fastened to the core of the pole handle by means of a direct or indirect connection which preferably simultaneously provides a guide function for the tilting movement between rest position (X1) and adjustment position (X2), and wherein, to this end, protrusions which at least partially engage in curved orifices in the side surfaces are particularly preferably provided on the core and/or on a separate element.

Aspect 6: Pole handle according to one of the preceding aspects, characterized in that latching elements are provided, which can arrest the strap fastening element with latching action in the rest position (X1) and/or in the adjustment position (X2), wherein preferably the strap fastening element has at least a first latching channel, in which at least a first latching ridge engages in the rest state (X1), in at least one side surface, wherein the strap fastening element preferably has two latching channels which are arranged on two mutually opposite side walls of the strap fastening element that are arranged parallel to one another, and wherein preferably the core has two latching ridges which are directed inwards into the central orifice and which are arranged on two mutually opposite side walls of the core that are arranged substantially parallel to one another, said latching ridges engaging in the two latching channels (30*a*, 30*b*), and/or wherein preferably the strap fastening element has at least a second latching channel, in which at least a first latching ridge engages in the adjustment position (X2), in at least one side surface, wherein the strap fastening element preferably has two latching channels which are arranged on two mutually opposite side walls (5*a*, 5*b*) of the strap fastening element that are arranged parallel to one another, and wherein preferably the core (1*a*) has two latching ridges which are directed inwards into the central orifice and which are arranged on two mutually opposite side walls of the core that are arranged substantially parallel to one another, said latching ridges engaging in the two latching channels.

Aspect 7: Pole handle according to one of the preceding aspects, characterized in that the hand strap has a strap portion which encircles the hand of the user, and also has a deflection portion which adjoins the strap portion on one side, which is introduced into a slot-like passage opening of the strap fastening element and which is guided downwards in the central orifice around a deflection region of the strap fastening element, and a first free end which protrudes from the central orifice and which adjoins the deflection portion, wherein the hand strap also has a second end which is adjacent to the encircling strap portion and which is fastened to the strap fastening element, preferably to a front wall, arranged in the central orifice of the pole handle, of the strap fastening element, particularly preferably by way of a fastening means which is preferably a screw, a pin, a rivet, a hook, a material bond, including an adhesive bond, welded connection, application by injection moulding, or a combination thereof.

Aspect 8: Pole handle according to one of the preceding aspects, characterized in that the strap fastening element has at least one orifice which is preferably arranged transverse to the direction of travel, and/or in that the strap fastening element has, on its front surface, in the transition to the top portion which, in use, forms the surface of the handle head in the rest position (X1), means which ensure a seal.

Aspect 9: Pole handle according to one of the preceding aspects, characterized in that the pole handle has at least one, preferably clip-like, attachment which is connected to the strap fastening element and/or to the core in a form-fitting and releasable manner, wherein preferably the attachment has two side walls which converge in a front wall in the direction of travel (L) and which are connected towards the bottom in a front region by a base, wherein the side walls each have a free end which is directed rearward counter to the direction of travel (L) and on which a respective latching peg is arranged, and wherein the latching pegs engage in a respective curved guide channel arranged on opposite side walls of the strap fastening element, as a result of which the strap fastening element is guided in the central orifice of the pole handle during a tilting movement of the strap fastening element, and wherein preferably the at least one guide channel is formed along the curvature of a top portion of the strap fastening element.

Aspect 10: Pole handle according to aspect 9, characterized in that the attachment is connected to the core of the pole handle in a form-fitting and releasable manner, preferably by means of at least one latching connection.

Aspect 11: Pole handle according to one of the preceding aspects, characterized in that the angle between the rest position (X1) and the adjustment position (X2) lies in the range from 20-90°, preferably in the range from 30-80°, particularly preferably in the range from 45-70°.

Aspect 12: Pole handle according to one of the preceding aspects, characterized in that the pole handle has a first form-fitting connection between the core and the strap fastening element, and also a second form-fitting connection between the strap fastening element and the attachment and a third form-fitting connection between the core and the attachment.

Aspect 13: Pole handle according to one of the preceding aspects, characterized in that the strap fastening element has a curved top portion which, in the fixed position, is integrated at least partially or in particular virtually completely in an outer contour of the head region.

Aspect 14: Method for assembling a pole handle according to one of the preceding aspects, characterized in that the hand strap is fastened to the strap fastening element by way of a free end, and is subsequently introduced in the form of a module into the central orifice and fastened in the handle head in a tiltable manner by means of a transverse pin, wherein preferably prior to that or subsequently thereto, at least one attachment is pushed on and fastened to the handle head preferably in a self-latching manner, and by means of this attachment or regions thereof, the strap fastening element is additionally secured to the handle head and is preferably additionally guided for the tilting movement.

Aspect 15: Pole, in particular a trekking pole, ski pole, cross-country ski pole or Nordic walking pole, having a pole handle according to one of the preceding aspects.

BRIEF DESCRIPTION OF THE DRAWINGS

Preferred embodiments of the invention are described below with reference to the drawings, which serve merely for elucidation and are not to be interpreted as restrictive. In the drawings.

DESCRIPTION OF PREFERRED EMBODIMENTS

A first preferred exemplary embodiment of the pole handle 1 according to the invention is illustrated in FIGS. 1-14. Identical reference designations in this case denote identical elements in accordance with the list of reference designations.

Figure 1B:
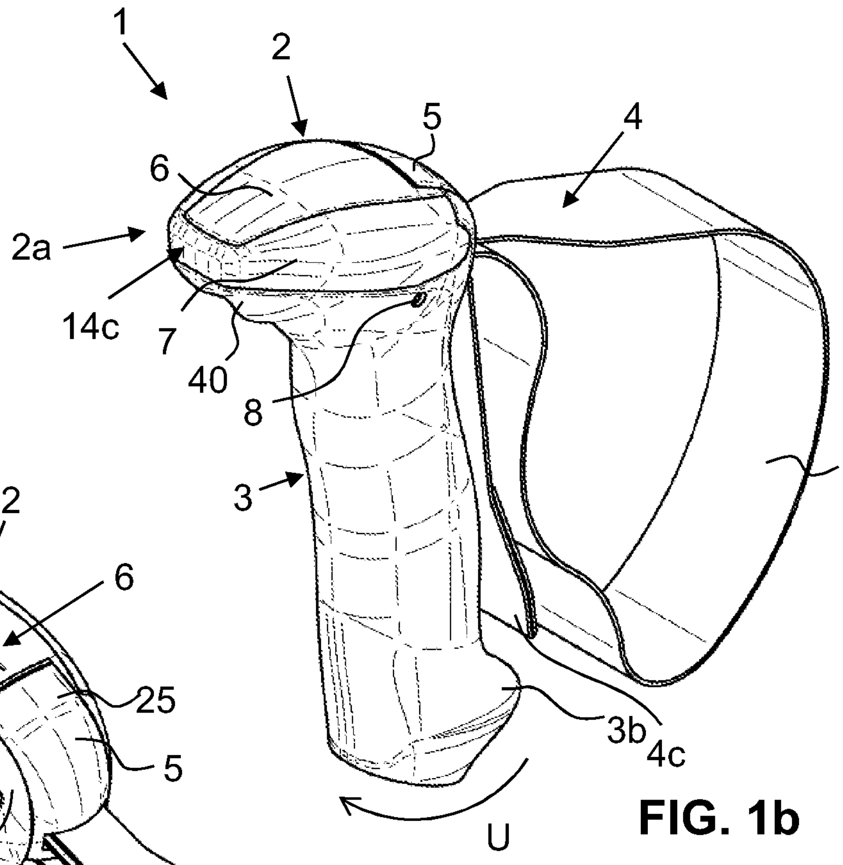
FIGS. 1*a* and 1*b* show perspective views of the pole handle according to a first exemplary embodiment in a) a view from the top left rear and in b) a view from the top left front.
Figure 1A:
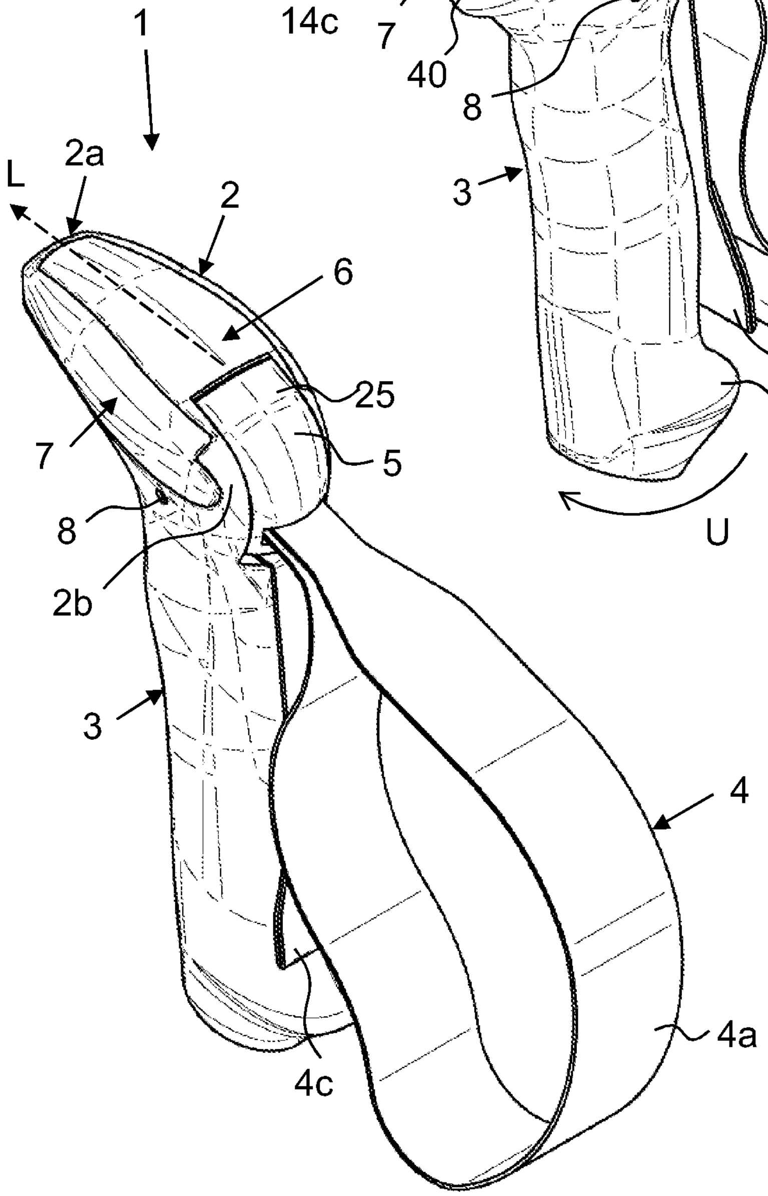
Figure 2:
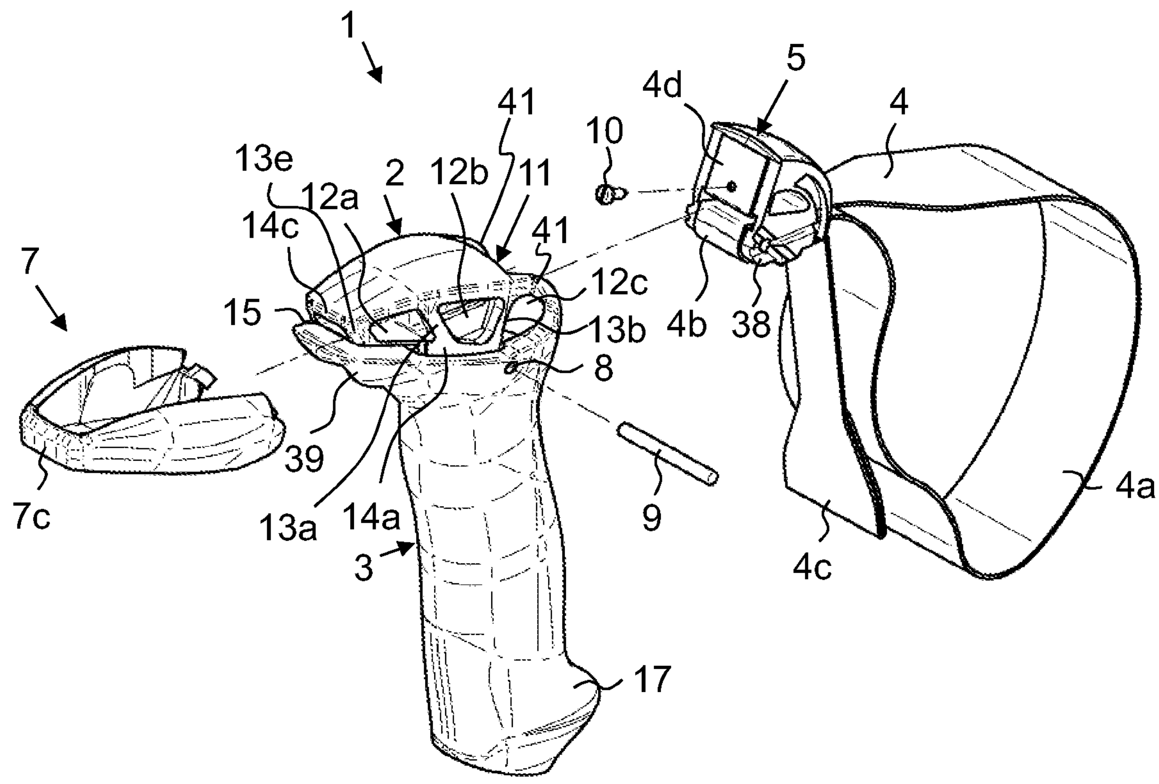
FIG. 2 shows a perspective exploded illustration of the pole handle according to a first exemplary embodiment from the top left front.
Figure 3:
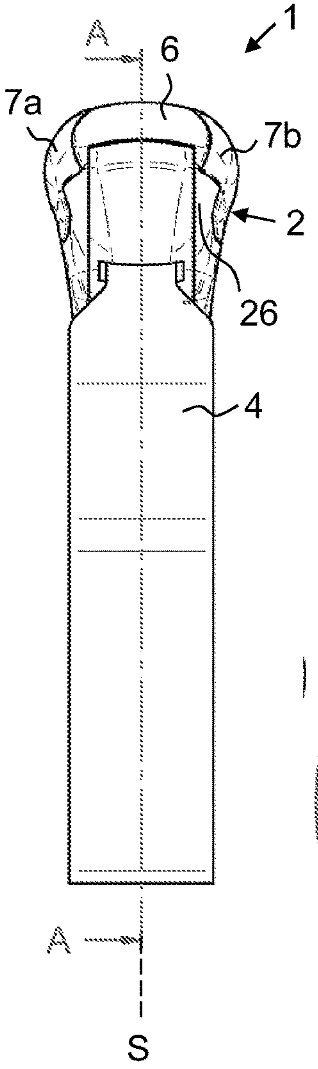
FIG. 3 shows a view of the pole handle according to a first exemplary embodiment from the rear along the direction of travel.

The pole handle 1 (see FIG. 1) has a head region 2 or a handle head and a handle region 3. The pole handle 1 is constructed substantially from the following basic elements, namely a pole handle core 1*a* (typically produced from a plastics material in an injection-moulding process in a one-component or multi-component form), an attachment element 7 which is pushed or placed onto the core 1*a* in the head region 2, or the handle nose 2*a*, from the front and partially clasps the front upper handle region of the head region 2, and a coupling module composed of a strap fastening element 5 with a hand strap 4 which is fastened thereto and which, in the present exemplary embodiment, is adjustable in terms of its size. As can be seen in FIG. 2 and FIG. 12, the core 1*a* of the pole handle is a component which is configured in one piece or multiple parts in multi-component form and which, in the handle region 3, typically has a surface coating composed of a material that is comfortable to grip, or a corresponding sheathing, typically composed of a handle foam or natural material, e.g. cork. The core 1*a* of the pole handle may also be split transverse to the pole axis, in order to assemble for example alternative handle materials in the form of sleeves, which may make up a sub-region of the gripping surface. At the lower end of the handle region 3, the pole handle 1 or the core 1*a* of the pole handle 1 has a shoulder 17 which is directed downward, counter to the direction of travel L, or a shoulder 17 which in use is directed towards the user of the pole handle, on which shoulder the user can brace the ball of their hand when gripping the pole handle 1 in the lower handle region in the peripheral direction U.

The core 1*a* of the pole handle 1 has, from the bottom, a central axial pole handle orifice 16 which is typically delimited towards the top towards the handle head, which is in the form of a blind hole and which is arranged substantially along the pole handle longitudinal axis S. The axial orifice 16 is used to receive and fasten a pole tube (not illustrated) or a tube portion of a pole, in particular of a ski pole, cross-country pole, trekking pole or of a Nordic walking pole.

The head region 2 of the pole handle 1 has a front region 2*a* pointing in the direction of travel L or a handle nose, wherein the direction of travel L is arranged substantially perpendicular to the pole handle longitudinal axis S and points away from the user of the pole handle 1. The head region 2 of the pole handle 1 is covered by the palm of the user when the user braces themselves from above on the pole handle. In the front region 2*a* of the head region 2, the pole handle 1 has an elevation 40 below the handle head 2 in the transition region to the handle region 3. Said elevation serves for gripping comfort particularly if the handle head is gripped at the top from behind and the fingers enclose this lower front region. It is then for example possible for the index finger to be placed into the recess in front of this elevation 40 and the middle finger to be placed into the recess behind this elevation 40, or shifted one finger position further, for the middle finger to be placed into the recess in front of the elevation 40 and the ring finger to be placed into the recess behind the elevation 40.

Figure 7A:
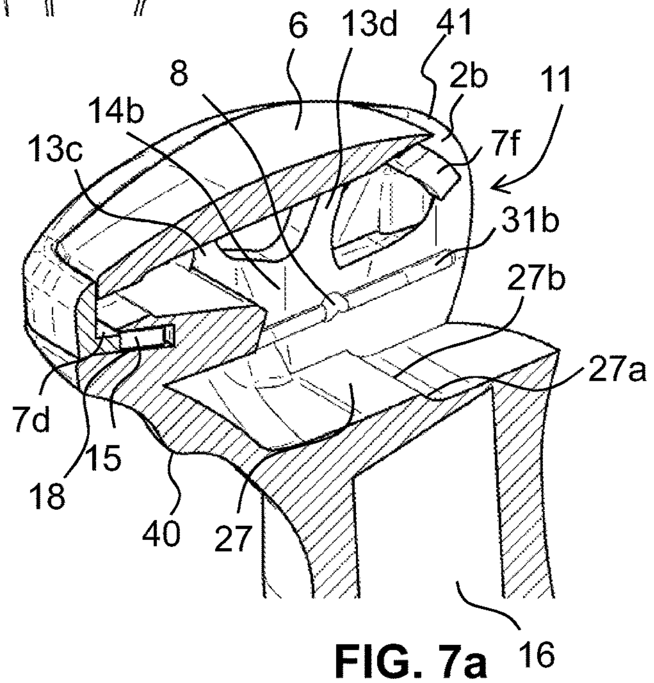
FIGS. 7*a* and 7*b* show sections of the pole handle along the section plane A-A of FIG. 3 according to a first exemplary embodiment in a perspective view without a strap fastening element, strap and pin, in a) a view from the top left front and in b) a view from the top left rear.
Figure 7B:
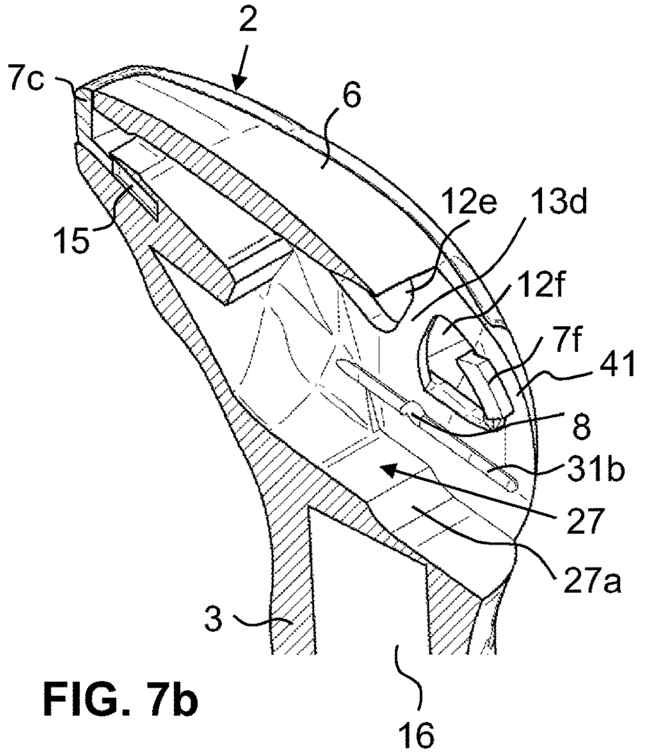

The head region 2 of the pole handle 1 has, on the top side, from the rear, a central orifice 11 for the purpose of receiving a strap fastening element 5 for a hand strap 4 (see for example FIG. 2 or FIG. 7). This central orifice 11 extends from the rear region 2*b* of the head region 2 into the front region 2*a*. The core 1*a* is thus of partly hollow configuration in the head region 2.

The core 1*a* has, as seen in the direction of travel L, a first, left-hand side wall 14*a* and a second, right-hand side wall 14*b*. Said side walls are open towards the rear side and converge in a front wall 14*c* in the front region 2*a* of the pole handle 1. In the upper and front handle region 2*a*, the side walls 14*a*, 14*b* are offset towards the inside in certain regions, as a result of which a shoulder 21 which is of partially encircling form in the peripheral direction U is formed. In the head region 2, in the aforementioned side walls 14, the core 1*a* has a plurality of apertures 12*a*-12*f*, 15. In the exemplary embodiment illustrated, said apertures are realized by a first aperture 12*a*, a second aperture 12*b* and a third aperture 12*c* in the first, left-hand side wall 14*a*, and by a fourth aperture 12*d*, a fifth aperture 12*e* and a sixth aperture 12*f* in the second, right-hand side wall 14*b* of the core 1*a*. Here, in each case two apertures 12*a*, 12*d* (at the front), and 12*b*, 12*e* (in the middle), and 12*c*, 12*f* (at the rear), respectively, lie opposite one another in the head region 2 of the core 1*a*. The apertures each form an aperture area 12, that is to say a cross-sectional area of the respective passage opening.

In the illustrated exemplary embodiment of FIG. 2, the front wall 14*c* has a seventh aperture 15.

The apertures 12*a*-12*f* in the side walls 14*a*, 14*b* are each separated from one another by webs 13*a*-13*d* and the foremost webs 13*e* and 13*f* in the respective side walls 14*a*, 14*b*. The webs 13*a*-13*f* run substantially from the top side or top surface 6 of the core 1*a* downward in the direction of the handle region 3 up to the partially encircling shoulder 21. The top surface 6, which is closed in this exemplary embodiment, is correspondingly supported by a multiplicity of webs 13, and the side walls and the top surface enclose a cavity 42 which runs in the direction of travel, said cavity transitioning into the orifice 11 towards the rear and being closed by the front wall 14*c* towards the front.

These webs may be oriented substantially parallel to the pole longitudinal axis, but may, as illustrated in this exemplary embodiment, preferably be oriented in the form of bionic structures so as to be adapted to the typical loading directions. Here, for example, the respectively rear webs 13*b*, 13*d* are inclined from the bottom to the top towards the rear, and the front webs 13*a*, 13*c* are inclined from the bottom to the top towards the front, respectively typically towards the rear at an angle of 30-60° with respect to the pole longitudinal axis, and towards the front at an angle of 20-45° with respect to the pole longitudinal axis. This produces to some extent a grid or mesh structure of the core 1*a* in the upper head region 2 for support of the top surface 6.

Furthermore, the top surface 6 is borne towards the rear on each side by an arcuate web 41, which connects the top surface 6 to the lower part of the core and laterally encloses and guides the strap fastening element 5.

The surface of the head region 2 of the pole handle 1, and thus the gripping surface, from above (see FIG. 11) is formed partially by the top side or top surface 6 of the core 1*a*, partially by the attachment element 7 and partially by the strap fastening element 5. In this case, in the rest position or the non-tilted fixed position, the curved top side and the top portion 25 of the strap fastening element 5 are integrated virtually completely in the outer contour of the head region 2. In this case, with the strap fastening element removed, the surface of the head region has, in a side view (see FIG. 12), a first offset 19 in the transition of the top side to the strap fastening element, and a second offset 20 in the transition to the lower handle region, so that there the strap fastening element is embedded into the surface of the handle head in a contour-flush manner.

Figure 9:
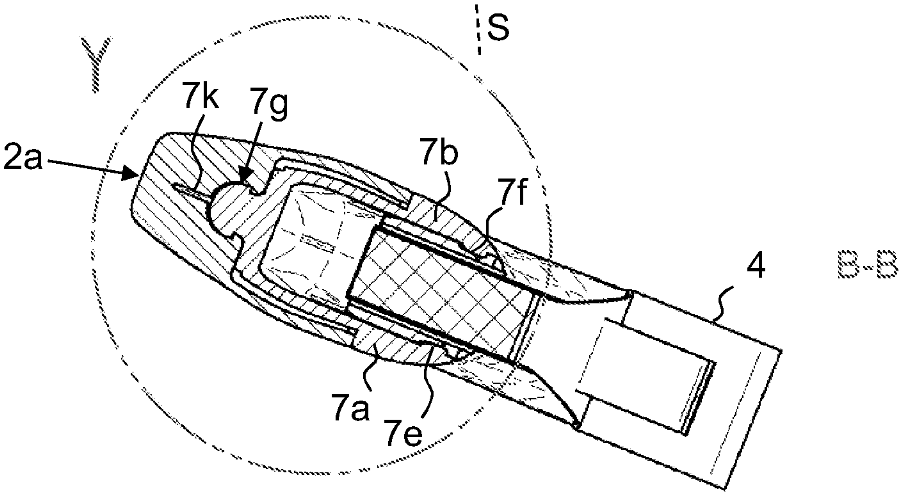
FIG. 9 shows a section Y along the section plane B-B of FIG. 8 with a hand strap.
Figure 10A:
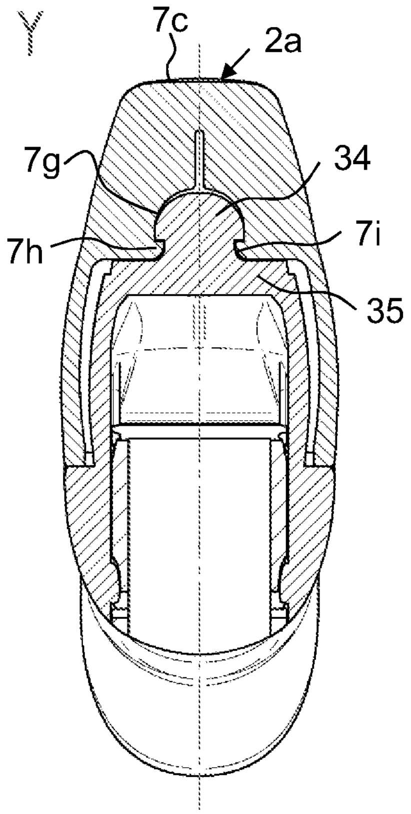
FIGS. 10*a* and 10*b* show shows an enlarged illustration of the section Y of FIG. 9 without a hand strap, this exemplary embodiment being illustrated in a) and a variant with latching tongues on the cover element being illustrated in b), the section being set at a somewhat higher location than in FIG. 10*a;*
Figure 10B:
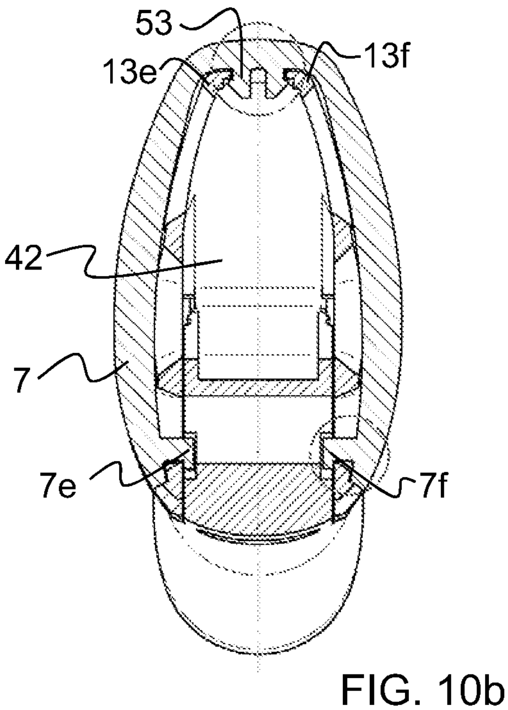
Figure 11:
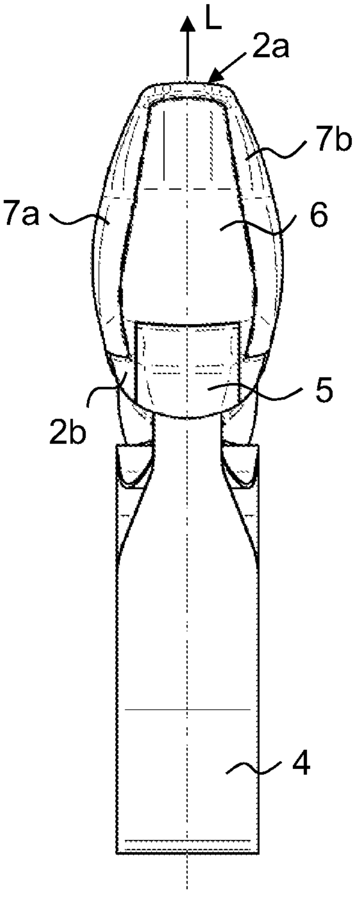
FIG. 11 shows a schematic view of the pole handle according to a first exemplary embodiment from above along the pole handle longitudinal axis with a hand strap.
Figure 12A:
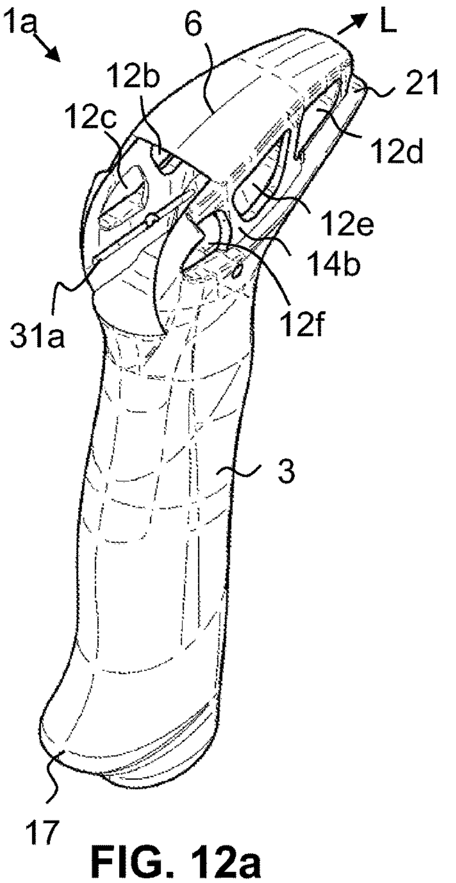
FIGS. 12*a* to 12*d* show views of the pole handle according to a first exemplary embodiment, only the core of the pole handle being illustrated, that is to say without an attachment element, without a pin, without a strap fastening element and without a hand strap, in a) a perspective view from the top right rear, in b) a perspective view from the top left front, in c) a view from the front counter to the direction of travel, in d) a lateral view from the left transverse to the direction of travel.
Figure 12B:
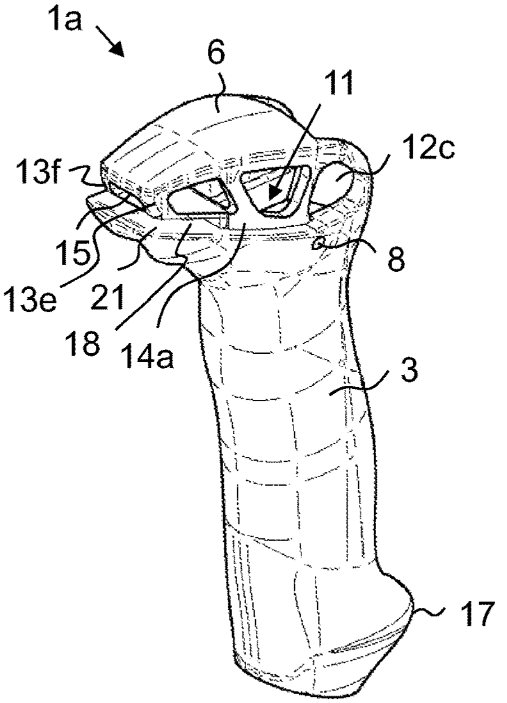
Figure 12C:
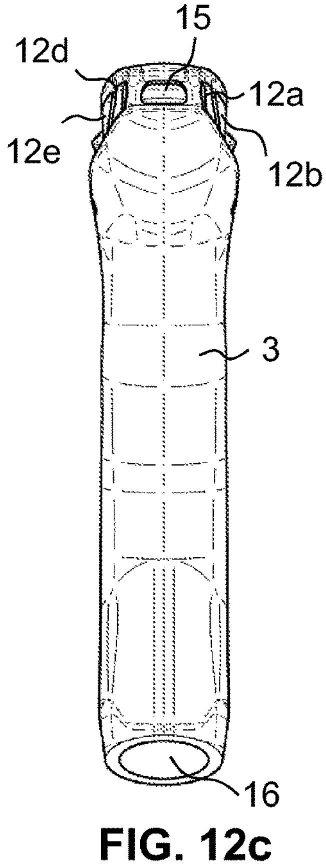
Figure 12D:
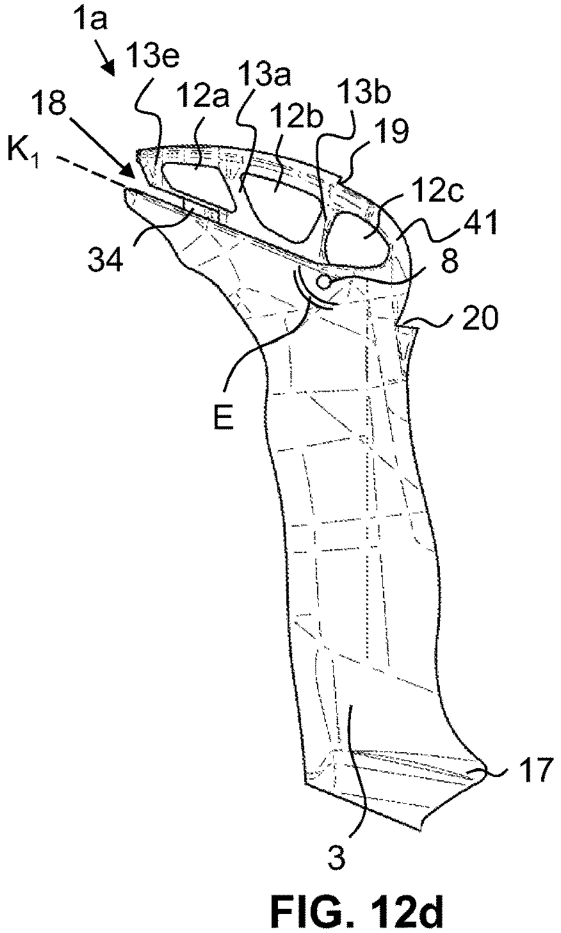
Figure 13A:
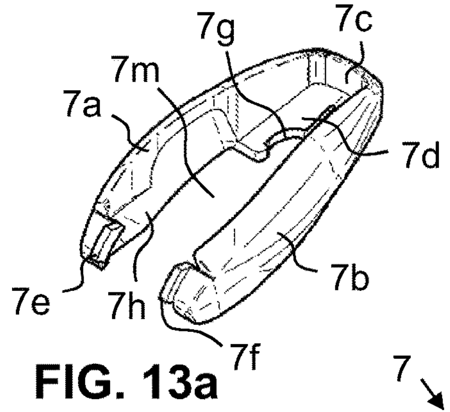
FIGS. 13*a* to 13*g* show views of the attachment of the pole handle according to a first exemplary embodiment, in a) a perspective view from the top right rear, in b) a perspective view from the top left front, in c) a view from above, in d) a sectional illustration along the section plane D-D in c), in e) a sectional illustration along the section plane E-E in c) as seen in the direction of travel, in f) a sectional illustration along the section plane F-F in d), in g) a view from below.
Figure 13B:
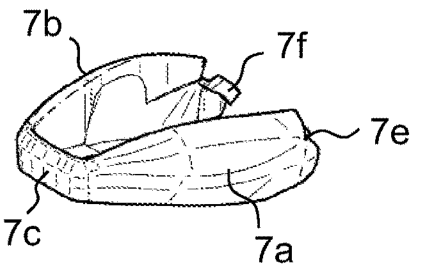
Figure 13C:
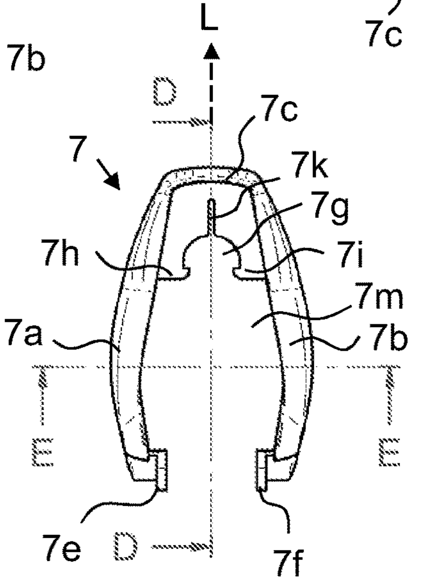
Figure 13D:
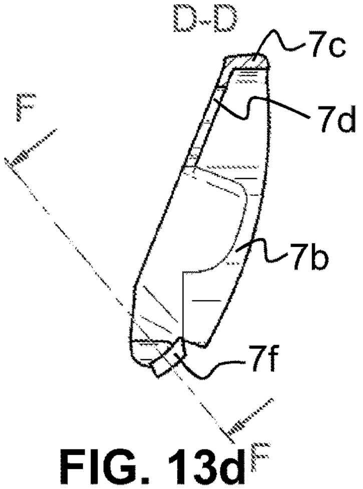
Figure 13E:
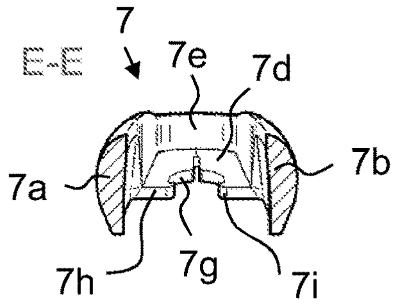
Figure 13F:
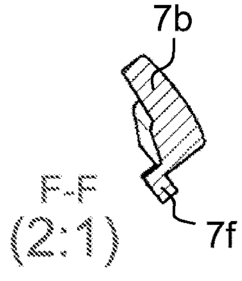
Figure 13G:
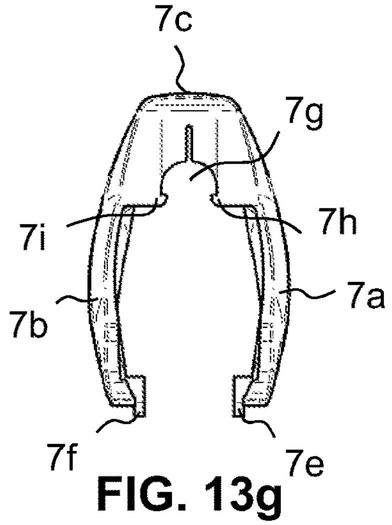
Figure 14A:
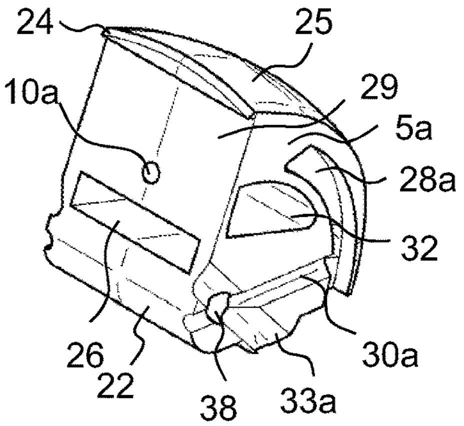
FIGS. 14*a* to 14*h* show views of the strap fastening element of the pole handle according to a first exemplary embodiment, in a) a perspective view from the top left front, in b) a perspective view from the top right rear, in c) a view from below, in d) a view from the right, as seen transverse to the direction of travel, in e) a view from the rear, in f) a view from the left, in g) a view from the front, as seen counter to the direction of travel, and in h) a view from above.
Figure 14B:
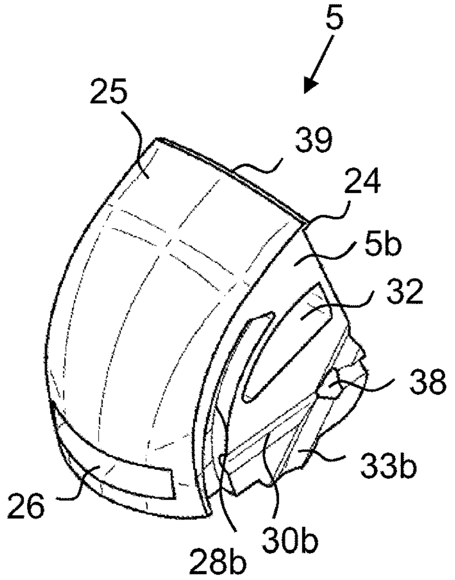
Figure 14C:
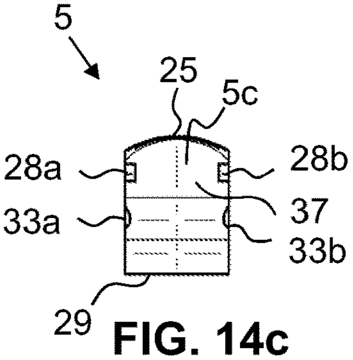
Figure 14D:
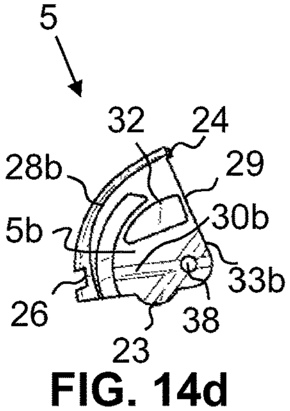
Figure 14E:
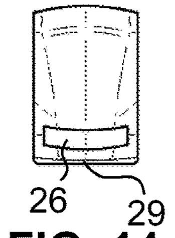
Figure 14F:
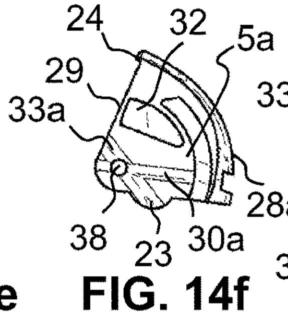
Figure 14G:
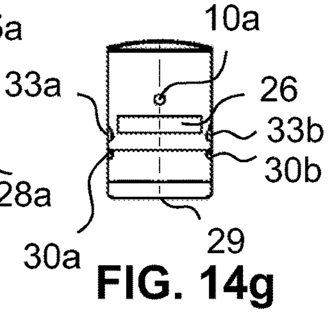
Figure 14H:
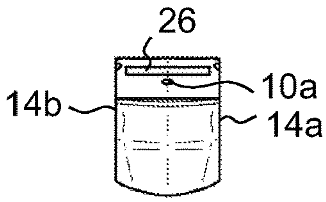

The attachment element 7 engages around or covers the front region or the front wall 14*c* of the core 1*a* by means of the front wall 7*c* of the attachment element 7 configured, as it were, in the form of a clip in the head region 2 of the pole handle 1, and covers the flanks or side walls 14*a*, 14*b* of the core 1*a* by means of its two arms 7*a*, 7*b* which extend in each case laterally from the front wall 7*c*, as can be seen in the exploded view of FIG. 2. Three sides of the front region of the handle head and the two lateral regions of the side walls 14 are thus enclosed by the two side walls 7*a*, 7*b* and the front wall 7*c* of the attachment 7. Furthermore, said attachment encloses a region which serves to receive a latching structure 35 in the interior of the head region 2 of the core 1*a*, as illustrated in FIG. 9 and FIG. 10*a*.

Figure 8:
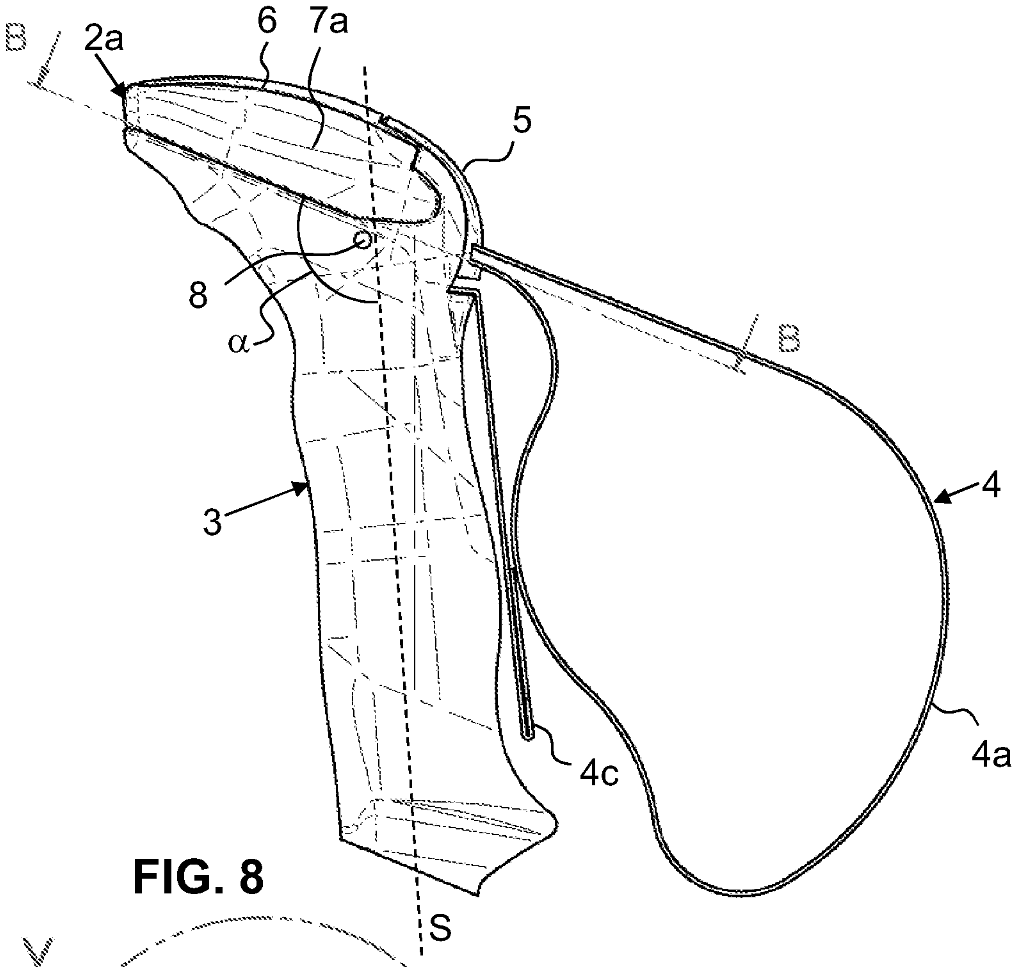
FIG. 8 shows a lateral schematic view of the pole handle according to a first exemplary embodiment from the left transverse to the direction of travel.

In the front region of the attachment 7, the latter has a base 7*d* (see FIG. 13) which connects the two side walls 7*a*, 7*b* to one another, which has an aperture 7*g* and which delimits the interior space in the front region towards the bottom. The base 7*d* extends substantially parallel to the section plane B-B which is depicted in FIG. 8 and which extends parallel to a longitudinal axis of the head region K1. When the attachment 7 is being pushed from the front onto the core 1*a* in the head region 2 of the pole handle 1, the base 7*d* slides at least partially from the front into a slot 18 in the latching structure 35 and the attachment 7 is arrested with latching action on the core 1*a* of the pole handle 1. This is made possible by a form-fitting connection between a substantially semicircular latching tongue 34 with an undercut on the latching structure 35 in the interior of the head region 2 and a corresponding aperture 7*g* in the base 7*d* of the attachment (see FIG. 10*a*). The aperture 7*g* has a slot-like elongation 7*k* directed in the direction of travel L, in order to enable the widening of the attachment 7 for the arresting with latching action. The aperture 7*g* is delimited towards the rear by two lugs 7*h*, 7*i* which are directed inwards substantially transverse to the longitudinal axis of the side arms 7*a*, 7*b* of the attachment towards the interior space 7*m*. During the placing on of the clip-like attachment, the two lugs 7*h*, 7*i* engage under the two opposite foremost apertures 12*a*, 12*d* into the slot 18 in the head region 2 of the core 1*a* and are arrested with latching action, in the undercut behind the latching tongue 34 of the core 1*a*, to some extent in each case in a latching orifice or in the respective undercut.

Instead of this base 7*d* with a corresponding aperture 7*g*, it is also possible (see FIG. 10*b*) for latching tongues which are directed downward to some extent in the direction of travel to be provided on the front wall 7*c*, for example two such tongues having two laterally outwardly directed protrusions at the free end, and said latching tongues may engage in the aperture 15 in the handle head and may engage behind said aperture behind the webs 13*e* and 13*f* in the cavity 42 behind the front wall.

The apertures are all respectively overlapped or covered by a lateral arm 7*a*, 7*b* of the attachment. In the placed-on state, the front wall 7*c* and the side walls 7*a*, 7*b* of the attachment rest on the shoulder 21 of the core 1*a*, said shoulder encircling the head region 2 in the front region 2*a* and on the two sides and transitioning seamlessly with the curvature of the head region 2 into the rear region 2*b*. The arms 7*a*, 7*b* have a concave curvature which is directed towards the interior space 7*m* of the attachment 7.

The cover element 7 thus serves, inter alia, to seal, as it were, the open lightweight design comprising the webs, and thus to prevent dirt or similar from being able to penetrate into the handle head, and on the other hand to provide as smooth and transition-free a surface as possible for the handle. The cover element is typically and preferably manufactured from a transparent or translucent thermoplastic material, for example polyamide, polycarbonate, polyacrylate (e.g. PMMA), POM or a mixture of such materials, so that it is possible to view the internal structure.

At the free end of the respective first, left-hand arm 7*a* and of the second, right-hand arm 7*b* of the attachment, each arm 7*a*, 7*b* has a respective latching hook, latching web or latching peg 7*e*, 7*f*. This latching peg 7*e*, 7*f* extends from the respective arm 7*a*, 7*b* first inwards, that is to say towards the interior space 7*m* of the attachment 7, and then towards the upper rear side. These latching pegs 7*e*, 7*f* serve to fasten the attachment 7 to the strap fastening element 5, and thus indirectly to fasten the attachment to the core 1*a*, and also have a guide function for the strap fastening element 5, as described further below. In this case, the latching pegs 7*e*, 7*f* engage from the outside through the apertures 12*c* and 12*f*, respectively, and then engage in each case behind the arcuate web 41. In other words, the attachment 7 is pushed on from the front in an encompassing manner, engages by means of the latching pegs on the inner side around the webs 41 and locks in place further towards the front with the aperture 7*g* on the latching tongue 34.

The head region 2 of the pole handle 1 also has a rear region 2*b*, which faces the user of the pole handle and in which a hand strap 4 is fastened. In the illustrated first exemplary embodiment, the hand strap 4 is connected or coupled to the pole handle 1 by means of the strap fastening element 5 which is arranged in the central orifice 11 in the head region 2*a* of the pole handle 1 and which, in the embodiment illustrated, can be tilted by a movement shown in FIG. 5*a*. In the exemplary embodiment illustrated, the strap fastening element 5 is of virtually block-like configuration. The central orifice 11 of the pole handle 1 is delimited towards the bottom in the core 1*a* by a base 27 and is separated from the upper end of the pole handle orifice 16. The hand strap 4 has a strap portion 4*a* which is configured to at least partially enclose a hand or a wrist of the user of the pole handle. The strap portion 4*a* is arranged between a first, free strap end 4*c*, which exits from the pole handle interior and can be pulled manually for the purpose of reducing the strap width, and a second strap end 4*d* which is fastened in or to the strap fastening element 5.

Figure 6:
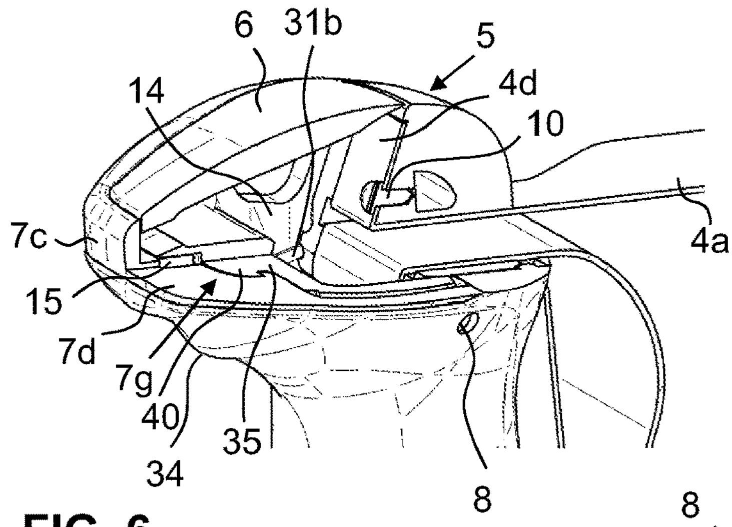
FIG. 6 shows a detail of the pole handle according to a first exemplary embodiment in a perspective illustration from the top left front with an inserted strap fastening element, the head region of the pole handle being cut-away along the section plane A-A of FIG. 3 up to the section plane B-B of FIG. 8 in a quadrant.

In the illustrated first exemplary embodiment, a deflection portion 4*b*, which is guided around a deflection region 22 of the strap fastening element 5, is arranged between the strap portion 4*a* and the first, free strap end 4*c* (see in particular FIG. 2 and FIG. 6). The second strap end 4*d* is fastened to a front side 29, facing towards the direction of travel L, of the strap fastening element 5 by way of a fastening means 10 configured in the form of a screw in the present exemplary embodiment. As a result of the formation of a protrusion 24 running in the direction of travel L on the upper front edge of the strap fastening element 5, the second, fastened strap end 4*d* is covered towards the top towards the top side of the head region 2*a* of the pole handle 1 and is protected against environmental influences, and the thickness of the strap material fastened in this region is compensated such that the front surface of the strap fastening element is substantially flush. In order to guide the strap band through for formation of the strap portion 4*a*, the strap fastening element 5 has a through-opening 26 in the form of a slot-like channel which is arranged substantially parallel to the bottom surface 35 of the strap fastening element 5, said through-opening being arranged with its longitudinal axis K2 substantially along the longitudinal axis K1 of the head region of the pole handle in the non-tilted state or rest state of the strap fastening element 5. Both strap regions that form the strap portion 4*a* for the hand are guided through this through-opening 26, that is to say both the region for the fastened second strap end 4*d* and that region for the free strap end 4*c*.

Figure 4:
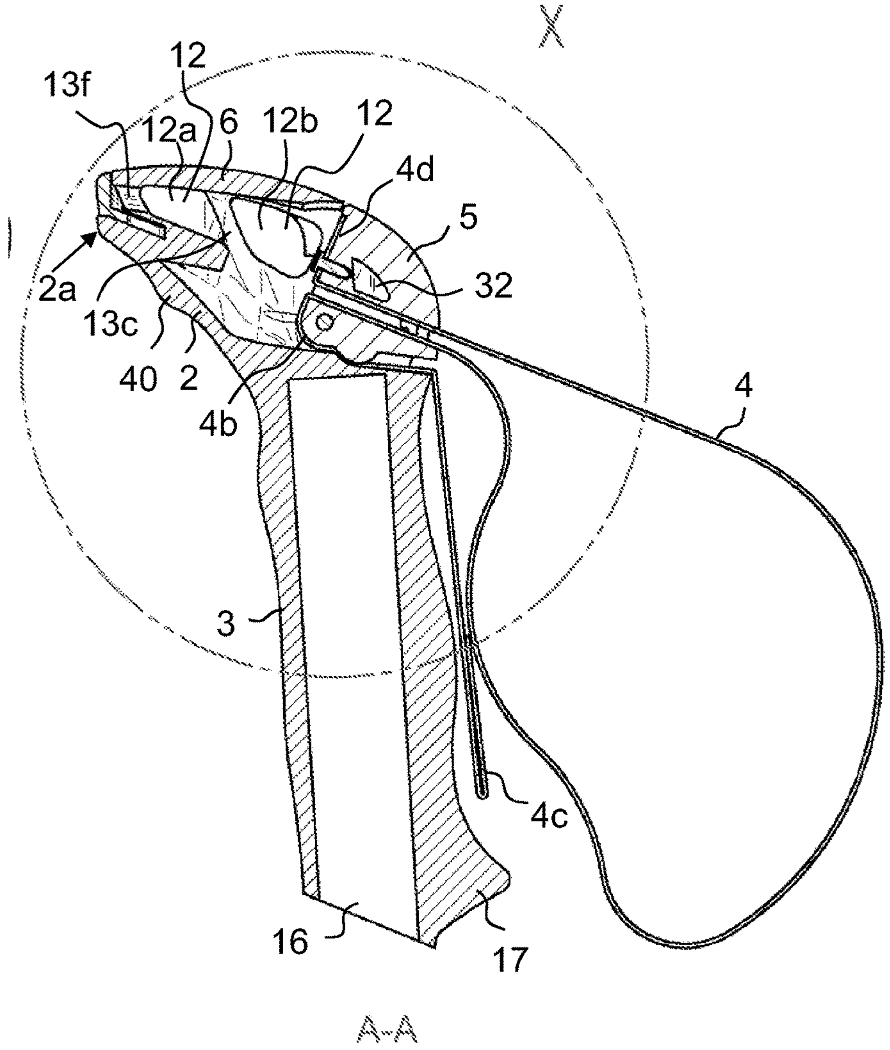
FIG. 4 shows an axial section X of the pole handle according to a first exemplary embodiment along the section plane A-A of FIG. 3.
Figure 5A:
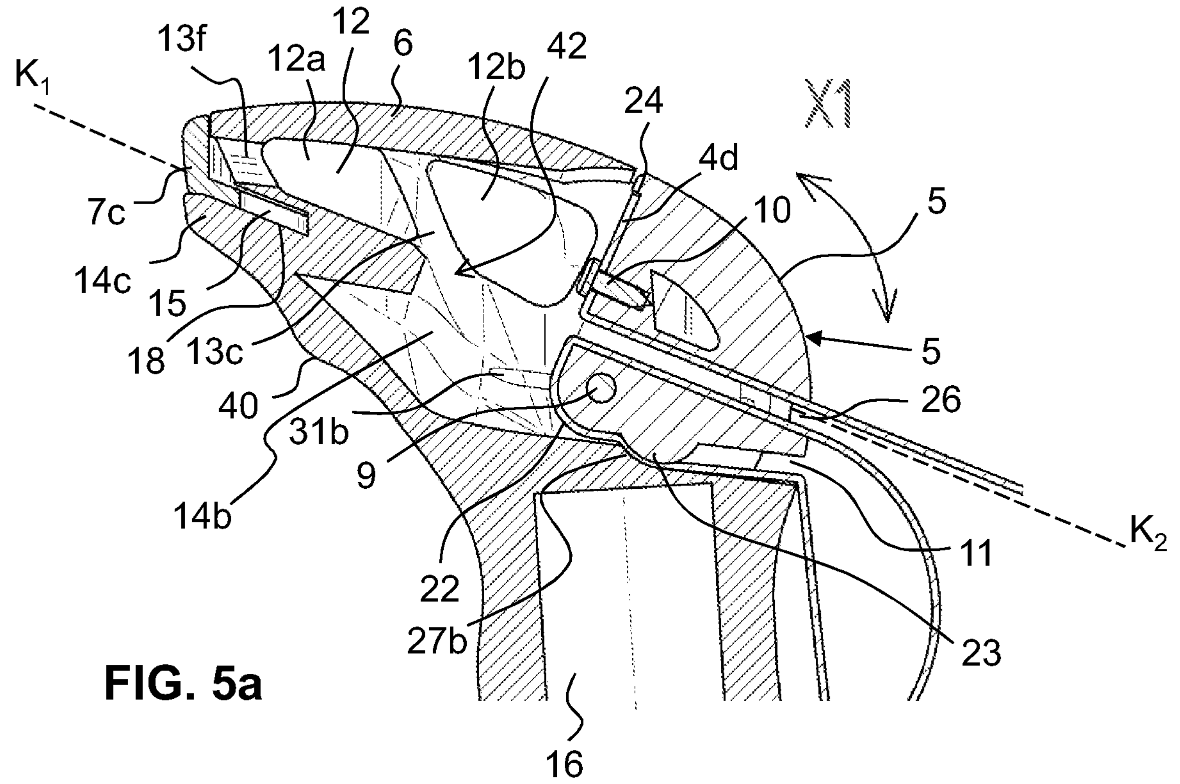
FIGS. 5*a* and 5*b* show details X of FIG. 4, in a) X1 with a fixed strap fastening element and a defined strap length and in b) X2 with a forwardly tilted strap fastening element and a length-adjustable strap length.
Figure 5B:
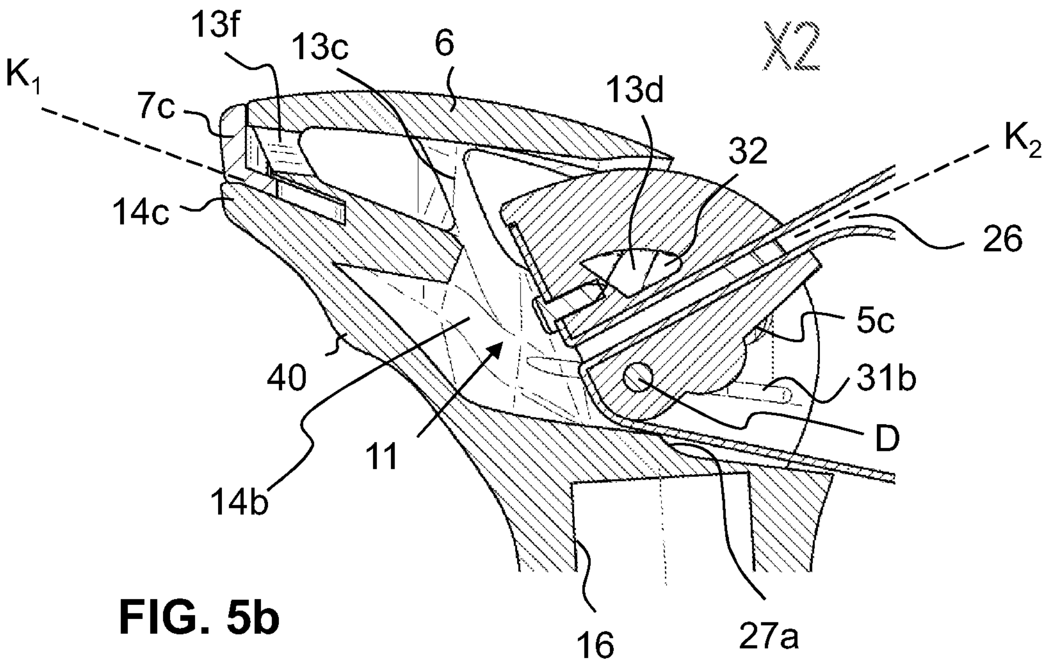

The strap fastening element 5 according to the illustrated first exemplary embodiment of FIGS. 1-14 is arranged in the central handle head orifice 11 so as to be tiltable or pivotable about an axis of rotation or tilt axis D about a pin 9 arranged in a passage opening 8, specifically between a rest position X1, as illustrated in FIG. 5*a*, and a tilted position X2, as illustrated in FIG. 5*b*. The pivoting range is in this case about 30-40°. In the rest position, the strap width is fixedly set, and in the tilted position of the strap fastening element 5, the strap width is adjustable, wherein the strap width in the latter position of the strap fastening element can be reduced by pulling on the first, free end 4*a* of the hand strap, and can be enlarged by pulling on that part of the strap portion 4*a* which faces towards the first, free end.

In the rest position of the strap fastening element 5, the deflection portion 4*b* of the hand strap 4 is clamped in between the base 27 of the handle head orifice 11 and the bottom side or the base 5*c* of the strap fastening element 5. Here, the clamping is achieved substantially analogously to a labyrinth seal, in the form of a clamping portion 23 of the strap fastening element 5, said clamping portion being configured in the form of a protrusion 23 which is directed downward towards the base 27 of the handle head orifice 11. In this case, the friction fit is also accompanied to some extent by a form fit by way of the clamping edge or possibly also (several) clamping edges. The clamping force required for the fixing of the strap is, as a result of the labyrinth edge, significantly lower than in the case of a linear line of force, which enables an improved clamping action with identical clamping force or an identical clamping action with lower clamping force. For this purpose, the base 27 of the handle head orifice 11 has a clamping portion 27*a* which is configured in the form of a step 37 by means of an edge 11*b*. In the rest state of the strap fastening element, the strap band is clamped here between its deflection portion 4*b* and the first, free strap portion 4*a*, which protrudes outwardly from the passage opening 26, configured in the form of a channel, of the strap fastening element 5, by way of a friction fit between the protrusion 23 and the stepped portion 27*b* of the base 27 of the handle head orifice 11. The friction fit owing to the deflection of the free end of the strap band, after passage through the passage opening 26, downward and rearward around the strap fastening element, which may be reinforced in a deflection region 22 (see FIG. 14) by corresponding transverse ribs or similar, is correspondingly reinforced by the clamping between the clamping protrusion 23 and the step 27*b*. Said clamping has the advantage that it is reinforced, in the case of the typical loading of the hand strap in a downward direction during use, by the corresponding torque that is applied as a result (in a clockwise direction in the illustration as per FIG. 4).

As illustrated in FIG. 2, the strap fastening element 5 is a separately configured component which may be fastened to a “core body” or core 1*a* of the pole handle 1. The fastening is effected by a pin 9, said pin being introduced into a first passage opening 8*a* in the left-hand side wall of the pole handle 1, then being guided through a passage opening 38 that extends through the strap fastening element 5 from a first, left-hand side wall 5*a* of the strap fastening element 5 up to a second, right-hand side wall 5*b*, and subsequently being guided through a second passage opening 8*b* in the right-hand side wall of the head region 2*a* of the pole handle 1. When the strap fastening element 5 has been inserted, the longitudinal axis of the passage opening 38 or the longitudinal axis of the pin 9 is arranged substantially transverse to the pole handle longitudinal axis S and transverse to the direction of travel L.

The strap fastening element 5 or folding element is illustrated in detail in FIG. 14. The strap fastening element 5 has a curved top portion 25 which has a front edge 39 that protrudes to some extent in the direction of travel. The top portion 25 or the top side of the strap fastening element is incorporated in the top side 6 of the pole handle 1 in the rest position and at the same time forms the rear region 2*b* of the head region 2 of the pole handle 1. The strap fastening element 5 is additionally captively retained by the engagement of the latching pegs 7*e* and 7*f* (see FIG. 7*a*) in corresponding guide channels 28*a* and 28*b*.

In order to save weight, the strap fastening element may have cutouts or windows 32 in those locations where, taking account of the loading, a configuration of solid material is not required. In general, the strap fastening element is preferably manufactured from a thermoplastic material, for example from polyamide, polypropylene, polyethylene, polycarbonate, in each case possibly with (glass) fibre reinforcement, or mixtures of such materials.

The strap fastening element 5 also has a bottom side 37 which, in the rest state inserted in the pole handle orifice 11, is directed towards the base 27 of the central orifice 11 of the pole handle 1. The strap fastening element 5 also has a first, left-hand side surface 5*a* and a second, right-hand side surface 5*b*, which are arranged parallel to a plane E defined by the handle head longitudinal axis K1 and the pole handle longitudinal axis S and which extend parallel to the section plane A-A illustrated in FIG. 3.

Arranged both in the first, left-hand side surface 5*a* and in the second, right-hand side surface 5*b* is a respective guide channel 28*a* and 28*b*, respectively, which is curved correspondingly to the rotary movement of the strap fastening element and which extends parallel to the curvature of the top portion 25, specifically from the bottom side 37 of the strap fastening element 5 (an open groove there) over a sub-region of the respective side wall 5*a*, 5*b*, and not completely up to the front wall 29 of the strap fastening element 5. This respective guide channel 28*a*, 28*b* serves not only for the aforementioned captive retainment of the element but also for the guidance of the strap fastening element 5 during the tilting operation about the axis of rotation or tilt axis 9 or about the pin 9. This guiding action is achieved in that the two above-described lateral latching pegs 7*e*, 7*f* of the attachment 7, which are likewise curved in a corresponding manner, engage or are arrested with latching action in these two guide channels 28*a*, 28*b*. This latching connection between the strap fastening element 5 and the attachment 7 connects the attachment 7 to the strap fastening element 5, and in this case also indirectly connects the attachment to the core 1*a* of the pole handle 1 via the strap fastening element 5. The latching connection thus at the same time provides a guide function for the rotation of the strap fastening element 5 between the latching position and the adjustment position, and also a captive-securement action for the attachment 7 on the core 1*a* of the pole handle 1.

Arranged in both side surfaces 5*a*, 5*b* of the strap fastening element 5 is a respective latching channel 33*a*, 33*b* in which a respective latching ridge 31*a*, 31*b*, directed inwards from the side wall 14*a*, 14*b* of the core 1*a*, engages in the rest position, that is to say in the non-tilted position of the strap fastening element 5. In this case, the latching channels 30*a*, 30*b* each run substantially parallel to the bottom surface 37 of the strap fastening element 5. The latching ridges 31*a*, 31*b* run substantially parallel to the base 27 of the central orifice 11 of the core 1*a*.

Each side wall 5*a*, 5*b* of the strap fastening element 5 also has a respective further latching channel 33*a*, 33*b*, which intersects the first and second latching channel 30*a*, 30*b*, respectively, at an acute angle. The point of intersection of the first latching channel 30*a* with the third latching channel 33*c* in the first side wall 5*a* of the strap fastening element 5, and the point of intersection of the second latching channel 30*b* with the fourth latching channel 33*d* in the second side wall 5*b* of the strap fastening element 5, is defined by the passage opening 38 in the strap fastening element 5 or by the receiving channel for the transverse pin 9 for the tiltable connection of the strap fastening element 5 to the pole handle core 1*a*. In the non-tilted rest state as per FIG. 5*a*, the strap fastening element 5 is arrested with latching action, by means of its first and second latching channels 30*a*, 30*b*, in the two mutually opposite latching ridges 31*a*, 31*b* in the core 1*a*, which can be seen for example in FIG. 6 on the second side wall 14*b* of the core 1*a*. In order to tilt the strap fastening element 5 forwards for the purpose of adjusting the diameter of the hand strap, the strap portion 4*a* of the hand strap 4 is pulled upward. During the tilting of the strap fastening element 5 forwards about the axis of rotation/tilt axis or about the transverse pin 9, the latching ridges 31*a*, 31*b* are forced out of the respective corresponding first and second latching channels 30*a*, 30*b*, and thus this latching connection is cancelled, wherein, in the tilted state as per FIG. 5*b*, the latching ridges 31*a*, 31*b* are arrested with latching action in the third and fourth latching channel 33*a*, 33*b*, respectively, and thus a further latching connection is formed. The arresting with latching action and the removal of latching action leads, on the one hand, to a simple form-fitting fixing of the respective position, but, on the other hand, also leads to haptic and possibly even acoustic feedback for the user. Furthermore, during the tilting or pivoting of the strap fastening element 5, the clamping region 23 of the strap fastening element 5 is lifted off from the step portion 27*a*. During the tilting operation, the protrusion 24 on the top portion 25 of the strap fastening element 5 is also pivoted into the central orifice 11 of the head region 2.

The strap fastening element 5 also has a front surface 29 which is directed towards the direction of travel L and the surface of which extends at an angle of less than 90° with respect to the bottom surface 27 of the strap fastening element 5. An orifice 10*a* is arranged substantially centrally in this front surface 29, said orifice serving to receive a fastening means 10 for the second strap end 4*d*. In the illustrated exemplary embodiment of FIG. 2, or FIGS. 5*a* and 5*b*, this fastening means is configured in the form of a screw. Here, however, it is also possible to use a rivet, a pin, an adhesive bond, an eye in the hand strap with a hook, or a combination of such fastening means.

If the strap fastening element 5 is replaced or is removed for example for the exchange of the hand strap, the attachment 7 can first be removed from the core 1*a* and from the strap fastening element 5, that is to say the latching connection between the latching pegs 7e, 7f on the arms 7a, 7b of the attachment 7 and the strap fastening element 5 can be released by spreading the arms 7a, 7b apart from one another. As a result of this spreading-out operation, the latching connection between the latching tongue 34 of the core 1a and the latching lugs 7g, 7h on the base 7d of the attachment 7 is also released. Subsequently (or even already prior to that), the transverse pin 9 can be pushed out of the passage opening 8a in the strap fastening element 5 and out of the through-opening 8 below the head region 2 of the core 1a, for example by means of a pin of smaller diameter. By pulling the strap fastening element 5 towards the rear along the latching ridge 31a, 31b, it is possible to remove the strap fastening element 5 from the central orifice 11 of the core 1a.

Alternatively, it is possible to first push the transverse pin 9 out of the passage opening 8a in the strap fastening element 5 and out of the through-opening 8 below the head region 2 of the core 1a, for example by means of a pin of smaller diameter. Then, by spreading the arms 7a, 7b apart from one another and by pulling the strap fastening element 5 towards the top or towards the rear, it is possible to remove the strap fastening element 5 from the central orifice 11 of the core 1a. Subsequently, the attachment 7 is removed from the core 1a, that is to say the latching connection between the latching pegs 7e, 7f on the arms 7a, 7b of the attachment 7 is released.

In order to assemble the pole handle 1 during production or after the replacement or repair of the strap fastening element 5 or of the hand strap 4, either the strap fastening element 5 is first inserted into the central orifice 11 of the handle head 2 of the pole handle 1 substantially from the rear along the longitudinal axis K1 of the head region 2 and along the latching ridges 31a, 31b and fastened to the core 1a of the pole handle 1 by means of the transverse pin 9, as described above, and subsequently the attachment 7 is pushed from the front onto the core 1a of the pole handle 1 for the further, indirect connection of the strap fastening element 5 to the core 1a of the pole handle 1. Or, in the reverse order, first the attachment is placed on and then the strap fastening element 5 is inserted and fastened in the central orifice 11 of the handle head 2 of the pole handle 1.

Figure 15:
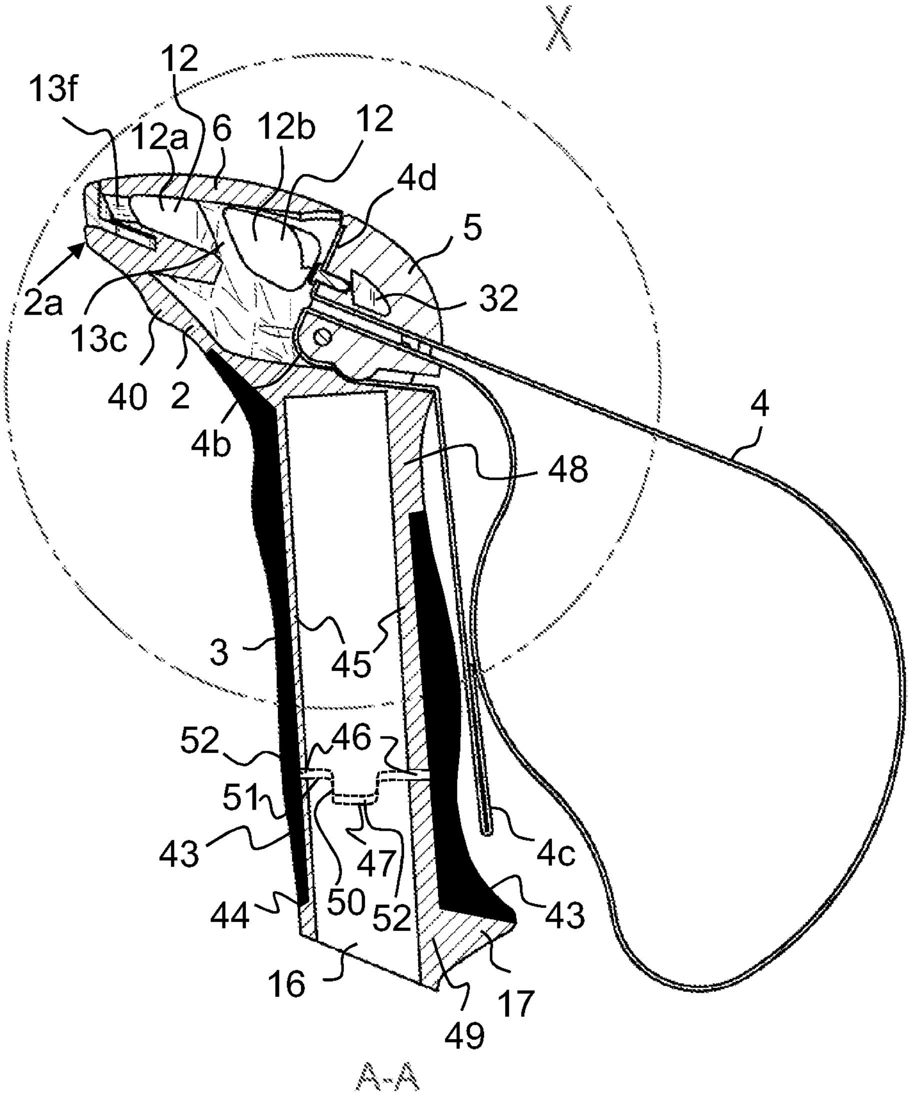
FIG. 15 shows an axial section X of the pole handle according to a first exemplary embodiment along the section plane A-A of FIG. 3, a sheathing composed of a cork or foam material being arranged in the handle region.

A variant of the handle as per FIG. 4 is illustrated in FIG. 15. Here, the handle has an encircling sheathing 43 composed of a cork material or a foam material (for example EVA) in the handle region. In this case, the sheathing 43 is inserted into an encircling recess 44 in the actual region 45 of the hard core material which forms the handle. In this case, the sheathing 43 adjoins the contour of the handle all the way along the edge in a flush manner. As a result, a construction that is particularly comfortable to grip and that is additionally lightweight is ensured. In order that such a construction may be assembled in a simple manner, the cylindrical region 45 of the hard core material of 3 has an encircling slot 46, that is to say the handle is of virtually two-part configuration in relation to the hard core material, and there is an upper region 48 comprising the head region 2 and the upper part of the region that forms the axial orifice 16, and a lower part 49 comprising for example the shoulder 17 and the lower part of the region that forms the axial orifice 16.

Advantageously, as illustrated in dashed form in the figure, the slot 46 is designed with a meandering profile 47, in particular such that, as a result, a captive-securement action is ensured to some extent, and a form fit or even a force fit between the upper and the lower part may also be provided to some extent. In a preferred variant, the meandering slot 46 has longitudinal portions 50 of the edges, which run along the axis of the pole, and transverse portions 51 of the edges, which run in the peripheral direction and perpendicular to the axis of the pole. Preferably, the longitudinal edges of the meandering slot from the upper part and lower part join one another in a virtually play-free manner or even in sliding abutment or specifically even in a frictionally rubbing manner in order to achieve as precise an orientation of the two handle parts as possible with respect to rotation about the pole axis. In a further advantageous manner, in the case of an assembled sheathing, the meandering slot forms, in terms of its transverse profile with respect to the pole axis, at the transverse edges 51, a spacing 52 between the end-side contact surfaces of the two sleeve portions of the handle parts. Overdeterminacy of the handle parts is thereby avoided. Independently of the other further features of the exemplary embodiment, which is used here for the purpose of illustration, this design of the slot is advantageous and considered to be in accordance with the invention.

Such a handle head is assembled by initially providing the upper region 48, subsequently pushing the sheathing 43 from below onto the cylindrical region 45, and then pushing the lower region 49 from below into the then exposed lower opening in the sheathing 43. The parts are connected together by providing adhesives between the sheathing and the upper region 48 and the lower region 49; connecting means may additionally be provided between the upper region 48 and the lower region 49. Since, in the end, this region is fixed by the pushed-in pole tube, it may be sufficient for an adhesive bond from the respective region 48/49 to the sheathing 43 to be provided.

In an analogous manner, it is moreover also possible for the elastomer region already mentioned above to be arranged on the bottom side of the handle head in the region of the elevation 40 in a corresponding recess in the hard core material. However, such an elastomer region is typically not produced as a separate component, but is more easily injection-moulded directly onto the hard core material in a two-component process.

LIST OF REFERENCE DESIGNATIONS

| | |
|---|---|
| 1 | Pole handle |
| 1a | Core of 1, body, handle body |
| 2 | Head region |
| 2a | Front region, handle nose of 2 |
| 2b | Rear region of 2 |
| 3 | Handle region |
| 4 | Hand strap |
| 4a | Strap portion |
| 4b | Deflection portion |
| 4c | Free first strap end |
| 4d | Fastened second strap end |
| 5 | Strap fastening element/block |
| 5a | Left-hand, first side surface of 5 |
| 5b | Right-hand, second side surface of 5 |
| 5c | Bottom side/base of 5 |
| 6 | Top side/top surface of 1a or of 2 |
| 7 | Cover element/attachment element |
| 7a | Left-hand first arm of 7 |
| 7b | Right-hand second arm of 7 |
| 7c | Front wall of 7 |
| 7d | Base of 7 |
| 7e | First latching peg on 7a |
| 7f | Second latching peg on 7b |
| 7g | Orifice of 7 |
| 7h | Left-hand first lug on 7g in 7d |
| 7i | Right-hand second lug on 7g in 7d |
| 7k | Slot-like elongation of 7g |
| 7m | Interior space of 7 |

-continued

| LIST OF REFERENCE DESIGNATIONS | |
|---|---|
| 8 | Through-opening in 3 for 9 |
| 9 | Pin of 5 |
| 10 | Fastening means for 4d |
| 10a | Orifice in 5 for 10 |
| 11 | Central orifice in 2 |
| 12 | Aperture area |
| 12a | First aperture in 14a |
| 12b | Second aperture in 14a |
| 12c | Third aperture in 14a |
| 12d | Fourth aperture in 14b |
| 12e | Fifth aperture in 14b |
| 12f | Sixth aperture in 14b |
| 13a | First web of 1a in 2/14a |
| 13b | Second web of 1a in 2/14a |
| 13c | Third web of 1a in 2/14b |
| 13d | Fourth web of 1a in 2/14b |
| 13e | Left-hand foremost web in 14a |
| 13f | Right-hand foremost web in 14b |
| 14a | Left-hand first side wall of 1a on 2 |
| 14b | Right-hand second side wall of 1a on 2 |
| 14c | Front wall of 1a in 2a |
| 15 | Fifth aperture in 14c |
| 16 | Axial orifice in 3 |
| 17 | Shoulder on 3 |
| 18 | Slot in 2a |
| 19 | First offset in 6 |
| 20 | Second offset |
| 21 | Shoulder on 2 |
| 22 | Deflection region of 5 |
| 23 | Clamping region of 5 |
| 24 | Protrusion of 5 |
| 25 | Top portion of 5 |
| 26 | Passage opening of 5 |
| 27 | Base of 11 |
| 27a | Step, clamping portion of 27 |
| 27b | Edge of 27 |
| 28a | Guide channel for 7e |
| 28b | Guide channel for 7f |
| 29 | Front wall of 5 |
| 30a | First latching channel on 5a |
| 30b | Second latching channel on 5b |
| 31a | First latching ridge of 14a in 11 |
| 31b | Second latching ridge of 14b in 11 |
| 32 | Window in 5 |
| 33a | Third latching channel on 5a |
| 33b | Fourth latching channel on 5b |
| 34 | Latching tongue on 35 for 7g |
| 35 | Latching structure |
| 37 | Bottom side of 5 |
| 38 | Passage opening of 5, receiving channel for 9 in 5 |
| 39 | Front edge of 25 |
| 40 | Elevation under 2 |
| 41 | Arcuate web |
| 42 | Cavity |
| 43 | Cork or foam shell |
| 44 | Encircling recess in hard core material |
| 45 | Cylindrical region of the hard core material of 3 |
| 46 | Encircling slot in 45, dividing line |
| 47 | Meandering profile of 46 |
| 48 | Upper region of the hard core material |
| 49 | Lower region of the hard core material |
| 50 | Longitudinal edges of the slot 46 |
| 51 | Transverse edges of the slot 46 |
| 52 | Spacing between 51 from upper part and lower part |
| 53 | Latching tongue |
| α | Angle between K1 and S |
| D | Axis of rotation for 5 |
| E | Plane defined by handle head longitudinal axis K1 and pole handle longitudinal axis S |
| K1 | Longitudinal axis of 2a, longitudinal axis of 26 in rest position of 5 |
| K2 | Longitudinal axis of 26 in adjustment position of 5 |
| L | Direction of travel |
| S | Pole handle longitudinal axis |

-continued

| LIST OF REFERENCE DESIGNATIONS | |
|---|---|
| U | Peripheral direction of 1 |
| X1 | Rest position, position in which the length of the hand strap cannot be adjusted |
| X2 | Adjustment position, position in which the length of the hand strap can be adjusted |

The invention claimed is:

1. A pole handle comprising:

a head region and a handle region, and also an axial orifice which is open downwardly on one side and which is configured to receive a pole tube;

wherein the pole handle has a core;

wherein the core comprises two side walls comprising a first, left-hand side wall and a second, right-hand side wall, at least in certain regions;

wherein the two side walls are connected at a top by a top surface so that the side walls and the top surface enclose a cavity, and the first, left-hand side wall and the second, right-hand side wall in the head region laterally delimit the cavity;

wherein the two side walls each has at least one aperture in a direction transverse to a longitudinal axis of the pole handle and transverse to a direction of travel, and at least one of the two following conditions is met:

a. an aperture area of at least one of the apertures in one side wall is more than 10 $mm^2$, and b. a total area of all of the apertures in both side walls is more than 10 $mm^2$; and wherein the pole handle has at least one attachment which is releasably fastened to the core, which encloses the core in certain regions in the head region in a peripheral direction and which at least partially covers at least one of the apertures and orifices in the top surface on an outer side.

2. The pole handle according to claim 1, comprising at least one of the following structural features:

webs formed between the apertures, the apertures are formed by a grid structure, the aperture area of at least one of the apertures is more than 15 $mm^2$, the total area of all of the apertures on at least one side of the handle is more than 15 $mm^2$, or the total area of all of the apertures on both sides of the handle is more than 15 $mm^2$.

3. The pole handle according to claim 2, wherein the webs are oriented in an inclined manner with respect to the pole handle longitudinal axis, wherein webs which are arranged further towards the front in the direction of travel are inclined from the bottom to the top towards the front, particularly preferably at an angle with respect to the pole handle longitudinal axis of 20-80°, and webs which are arranged further towards the rear in the direction of travel are inclined from the bottom to the top towards the rear.

4. The pole handle according to claim 3, wherein the top surface is of closed or grid-like configuration.

5. The pole handle according to claim 1, wherein the attachment is configured in the form of a clip having two lateral arms, wherein the arms extend from a front wall of the attachment rearward to the rear region of the head region of the pole handle and in this case cover the side walls partially and the apertures arranged therein completely on the outer side.

6. The pole handle according to claim 1, wherein both the first, left-hand side wall and the second, right-hand side wall in the head region each have at least two apertures in a direction transverse to the pole handle longitudinal axis and transverse to the direction of travel, or wherein the first side wall and the second side wall each have at least two apertures which are separated from one another by a respective web, wherein the webs extend from the top surface of the pole handle downward in the direction of the handle region.

7. The pole handle according to claim 1, wherein the apertures in the two side walls are configured so as to be mirror-symmetrical with respect to a plane defined by the pole handle longitudinal axis and the direction of travel.

8. The pole handle according to claim 1, wherein, in relation to a lower region of the head region, the side walls are offset inward towards the cavity in an upper region of the head region, as a result of which a shoulder which partially encircles the head region in the peripheral direction and on which the at least one attachment at least partially rests is formed between the upper region of the head region and the lower region of the head region.

9. The pole handle according claim 8, wherein the first side wall and the second side wall each have at least two or three apertures which are separated from one another by a respective web, wherein the webs extend from the top surface of the pole handle downward in the direction of the handle region, and wherein the webs extend from the top surface of the pole handle downward in the direction of the handle region up to the partially encircling shoulder.

10. The pole handle according to claim 1, wherein the at least one attachment is configured to be at least partially transparent or translucent, such that the apertures of the core are visible from the outside.

11. The pole handle according to claim 1, wherein arranged between the top surface and a lower region of the handle head, on the rear side of the handle head, are two lateral arcuate or angled webs, and wherein the pole handle has the at least one attachment which is releasably fastened to the core, which encloses the core in certain regions in the head region in the peripheral direction and which at least partially covers the apertures and/or orifices in the top surface, including the aperture formed by the webs, on the outer side.

12. A pole having a pole handle according to claim 1.

13. The pole according to claim 12, configured as a trekking pole, ski pole, cross-country ski pole or Nordic walking pole.

14. The pole handle according to claim 1, wherein it the pole handle is for a ski pole, cross-country ski pole, trekking pole or Nordic walking pole.

15. The pole handle according to claim 1, wherein the individual aperture area of the majority or of all of the apertures is in the range from 10-50 $mm^2$, and/or in that the total area of the apertures on one side of the handle is in the range from 10-50 $mm^2$.

16. The pole handle according to claim 1, wherein the at least one attachment completely covers the apertures and/or orifices in the top surface on the outer side, wherein the attachment is fastened to the core in a force-fitting and/or form-fitting manner and/or is fastened in a form-fitting manner to a strap fastening element which is also inset in the handle head.

17. The pole handle according to claim 1, wherein the at least one attachment is configured in the form of a clip having two lateral arms, wherein the arms extend from a front wall of the attachment rearward to the rear region of the head region of the pole handle and in this case cover the side walls partially and the apertures arranged therein completely on the outer side, wherein each of the lateral arms has at least a first means for force-fitting and/or form-fitting connection to the core and at least a second means for force-fitting and/or form-fitting connection to a coupling element.

18. The pole handle according to claim 17, wherein at least the second means is a latching means which is arrested with latching action in a latching orifice or on a latching extension of a latching structure in the core.

19. Pole handle according to claim 1, wherein the first side wall and the second side wall each have at least two or three apertures which are separated from one another by a respective web, wherein the webs extend from the top surface of the pole handle downward in the direction of the handle region and are arranged substantially parallel to the pole handle longitudinal axis or in an angularly inclined manner with respect to the pole handle longitudinal axis.

20. The pole handle according to claim 19, wherein the webs are oriented in an inclined manner with respect to the pole handle longitudinal axis, wherein webs which are arranged further towards the front in the direction of travel are inclined from the bottom to the top towards the front, at an angle with respect to the pole handle longitudinal axis in the range from 30-60°, and webs which are arranged further towards the rear in the direction of travel are inclined from the bottom to the top towards the rear, at an angle with respect to the pole handle longitudinal axis in the range from 20-60°.

21. The pole handle according to claim 1, wherein, in relation to a lower region of the head region, the side walls are offset inward towards the cavity in an upper region of the head region, as a result of which a shoulder which partially encircles the head region in the peripheral direction and on which the attachment at least partially rests is formed between the upper region of the head region and the lower region of the head region, wherein a substantially continuous surface of the handle region, said surface being closed apart from gaps between components, is formed by the shaping of the attachment and the position thereof in this offset region.

22. The pole handle according to claim 1, wherein the at least one attachment completely covers the apertures and/or orifices in the top surface, including the aperture formed by the webs, on the outer side, wherein the attachment is fastened to the core in a force-fitting and/or form-fitting manner and/or is fastened in a form-fitting manner to a strap fastening element which is also inset in the handle head in that regions of the attachment engage behind the webs on the inner side, and engage in a guiding manner in curved orifices of a strap fastening element.

23. A pole handle comprising:

a head region and a handle region, and also an axial orifice which is open downwardly on one side and which is configured to receive a pole tube;

wherein the pole handle has a core;

wherein the core comprises two side walls comprising a first, left-hand side wall and a second, right-hand side wall, at least in certain regions, wherein the two side walls are connected at a top by a top surface so that the side walls and the top surface enclose a cavity, and the first, left-hand side wall and the second, right-hand side wall in the head region laterally delimit the cavity, and wherein the two side walls each has at least one aperture in a direction transverse to a longitudinal axis of the pole handle and transverse to a direction of travel, and at least one of the two following conditions is met:

a. an aperture area of at least one of said apertures in one side wall is more than 10 $mm^2$, and b. a total area of all of said apertures in both side walls is more than 10 $mm^2$; and wherein, in the head region which is delimited towards the top by the top surface, the pole handle has a central orifice on the rear side, a strap fastening element with a hand strap fastened to the strap fastening element being received in said central orifice in a rear region of the head region.

24. A method for assembling a pole handle according to claim 23, wherein the hand strap is fastened to the strap fastening element by way of a free end, and is subsequently introduced in the form of a module into the central orifice and fastened in the handle head in a tiltable manner by means of a transverse pin.

25. The method for assembling a pole handle according to claim 24, wherein an attachment is pushed on and fastened to the handle head preferably in a self-latching manner, and by means of this attachment or regions thereof, the strap fastening element is additionally secured to the handle head and is additionally guided for the tilting movement.

* * * * *